(12) United States Patent
Sano et al.

(10) Patent No.: US 10,113,852 B2
(45) Date of Patent: Oct. 30, 2018

(54) POINT-TO-POINT DISTANCE GAUGE, POINT-TO-POINT DISTANCE GAUGE SYSTEM, AND DISTORTION MEASUREMENT METHOD USING POINT-TO-POINT DISTANCE GAUGE SYSTEM

(71) Applicant: Body Shop Sano Co., Ltd., Niiza-shi, Saitama (JP)

(72) Inventors: Syusuke Sano, Niiza (JP); Masaya Sano, Niiza (JP)

(73) Assignee: Body Shop Sano Co., Ltd., Niiza-shi, Saitama (JP)

( * ) Notice: Subject to any disclaimer, the term of this patent is extended or adjusted under 35 U.S.C. 154(b) by 0 days.

(21) Appl. No.: 15/769,739

(22) PCT Filed: May 23, 2016

(86) PCT No.: PCT/JP2016/065144
§ 371 (c)(1),
(2) Date: Apr. 20, 2018

(87) PCT Pub. No.: WO2017/068806
PCT Pub. Date: Apr. 27, 2017

(65) Prior Publication Data
US 2018/0231366 A1    Aug. 16, 2018

(30) Foreign Application Priority Data

Oct. 23, 2015  (JP) .................................. 2015-208556

(51) Int. Cl.
*G01B 5/14*    (2006.01)
*G01B 5/30*    (2006.01)
(Continued)

(52) U.S. Cl.
CPC ............. *G01B 5/14* (2013.01); *G01B 3/1056* (2013.01); *G01B 5/30* (2013.01); *B60S 5/00* (2013.01);
(Continued)

(58) Field of Classification Search
CPC .......... G01B 5/14; G01B 3/1056; G01B 5/30; G01B 3/20
(Continued)

(56) References Cited

U.S. PATENT DOCUMENTS 5,343,628 A * 9/1994 Ham ......................... B60S 5/00
                                                     33/288
5,430,951 A * 7/1995 Jacky ................... G01B 3/1084
                                                     33/760
(Continued)

FOREIGN PATENT DOCUMENTS

JP    S61-123902 U    8/1986
JP    S61-173003 U    10/1986
(Continued)

OTHER PUBLICATIONS

International Search Report for PCT/JP2016/065144 dated Aug. 9, 2016.
Japanese decision to grant a patent dated Sep. 27, 2016.

*Primary Examiner* — Yaritza Guadalupe
(74) *Attorney, Agent, or Firm* — Yokoi & Co., U.S.A.; Toshiyuki Yokoi

(57) ABSTRACT

A point-to-point distance gauge includes a rod-like main body formed by fitting a plurality of cylindrical rods 111, 112, and 113 having different diameters with one another so as to be expandable to a desired length; a spherical-tipped shaft 12 provided on one end 113a of the main body 11 so as to be capable of being folded to a desired angle with respect to the main body 11 and to be capable of maintaining the desired angle, a tip 12a of the spherical-tipped shaft 12
(Continued)

being formed in a spherical shape having a diameter larger than a shaft diameter; and a conical-tipped shaft 13 provided on the other end 113*a* of the main body 11 so as to be capable of being folded to a desired angle with respect to the main body 11 and to be capable of maintaining the desired angle, a tip 13*a* of the conical-tipped shaft 13 being formed in a conical shape.

15 Claims, 18 Drawing Sheets

(51) Int. Cl.
*G01B 3/10* (2006.01)
*B60S 5/00* (2006.01)
*B62D 65/00* (2006.01)

(52) U.S. Cl.
CPC ......... *B60Y 2304/09* (2013.01); *B62D 65/005* (2013.01)

(58) Field of Classification Search
USPC .......................................................... 33/701
See application file for complete search history.

(56) References Cited

U.S. PATENT DOCUMENTS

| | | | | |
|---|---|---|---|---|
| 5,485,682 | A | * | 1/1996 | Le Breton ................ G01B 3/12 33/701 |
| 6,101,730 | A | * | 8/2000 | Marino ................... B28D 1/225 33/456 |
| 6,598,308 | B1 | * | 7/2003 | Johansson ............ G01B 5/0025 33/608 |
| 6,769,192 | B2 | * | 8/2004 | Johansson ................ G01B 3/08 33/608 |
| 7,275,335 | B2 | * | 10/2007 | Holec ...................... G01B 3/08 33/203.21 |
| 2011/0113640 | A1 | * | 5/2011 | Molina ................... G01B 3/205 33/608 |
| 2012/0110867 | A1 | * | 5/2012 | Molina ................... G01B 3/205 33/608 |

FOREIGN PATENT DOCUMENTS

| | | |
|---|---|---|
| JP | S63-129810 U | 8/1988 |
| JP | H04-318401 A | 11/1992 |
| JP | 2002-107105 A | 4/2002 |
| JP | 2003-004437 A | 1/2003 |
| JP | 2005-077178 A | 3/2005 |

* cited by examiner

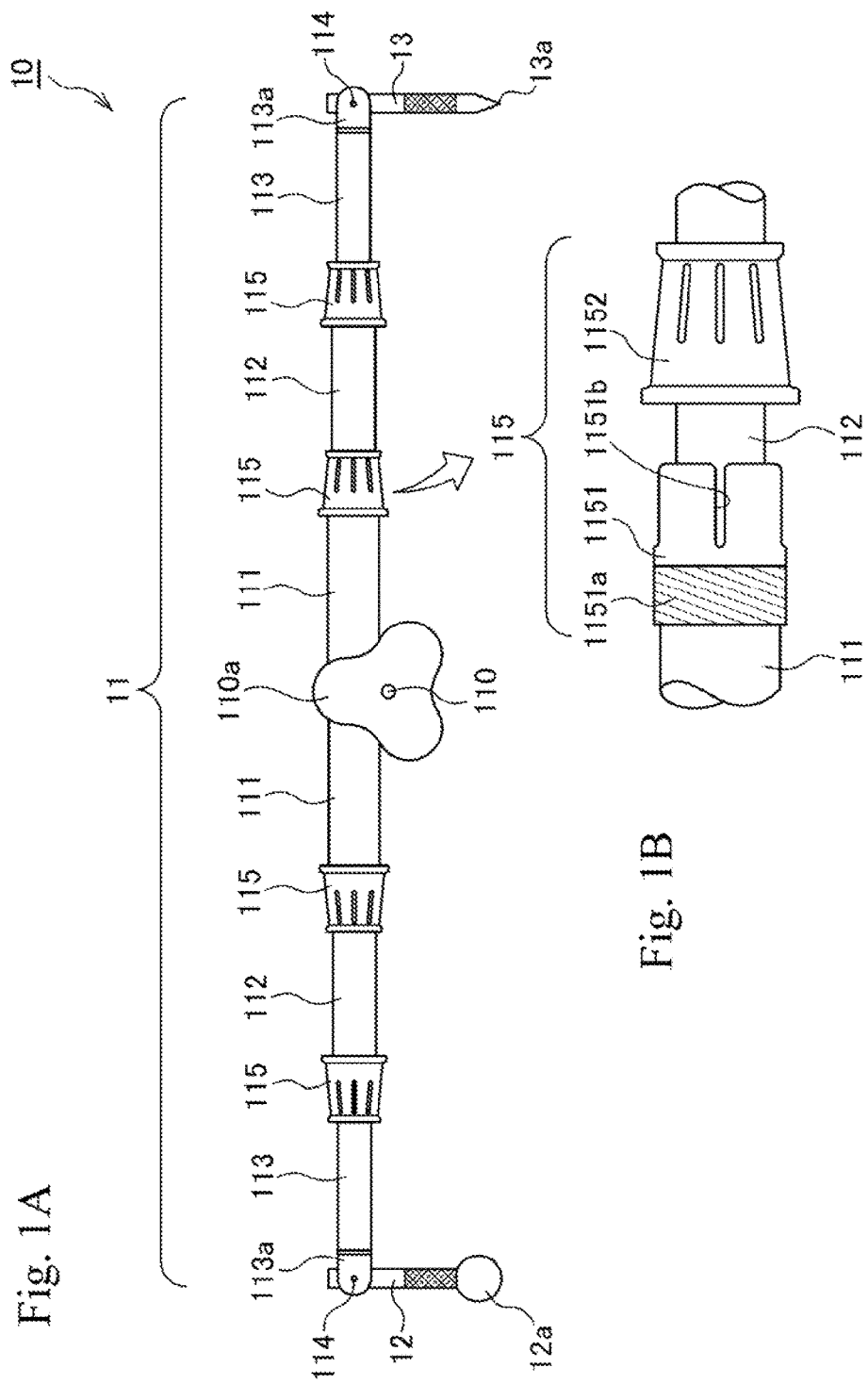

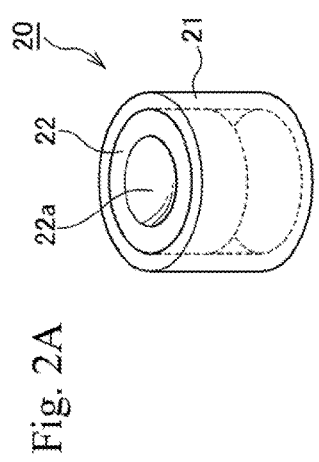
Fig. 2A
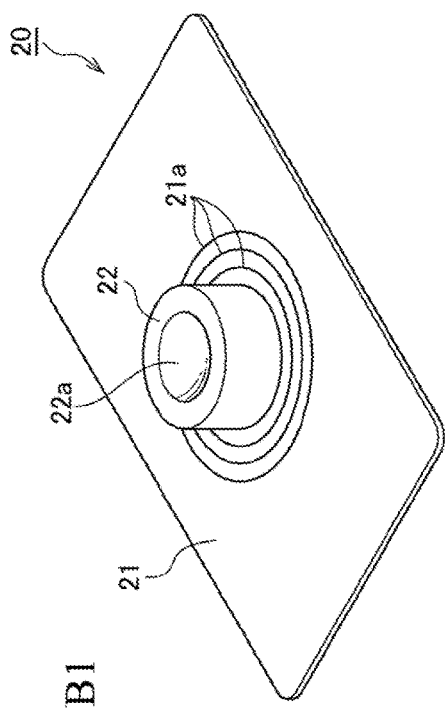
Fig. 2B1
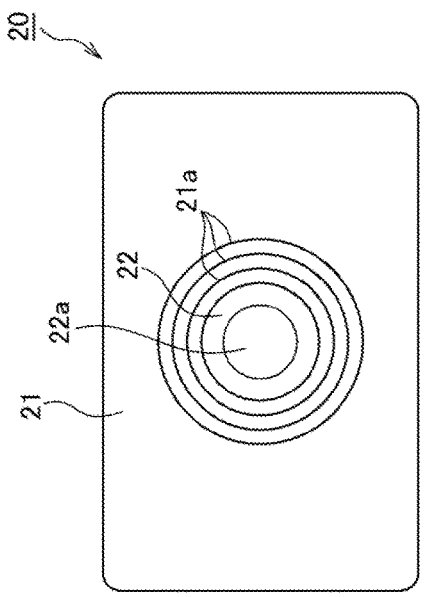
Fig. 2B2

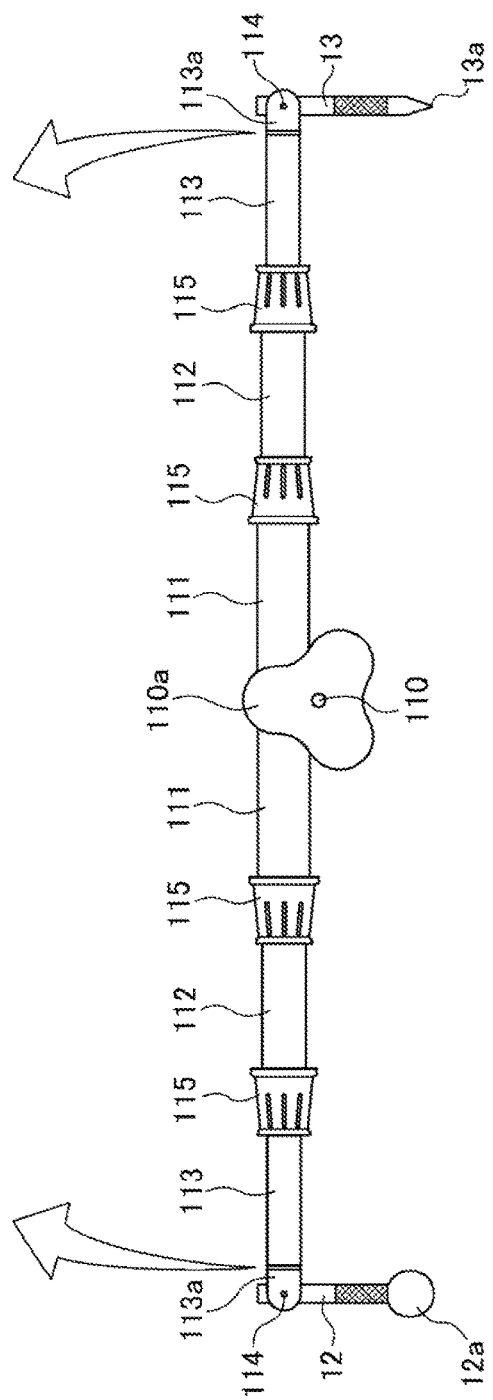
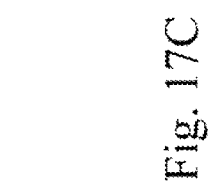
Fig. 17C
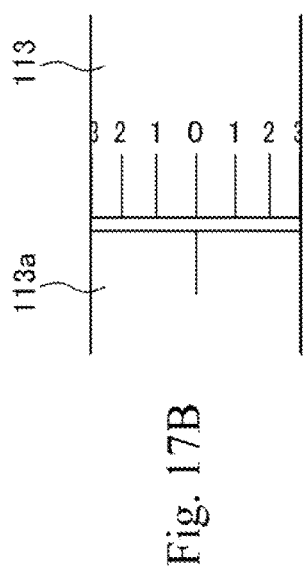
Fig. 17B
Fig. 17A

POINT-TO-POINT DISTANCE GAUGE, POINT-TO-POINT DISTANCE GAUGE SYSTEM, AND DISTORTION MEASUREMENT METHOD USING POINT-TO-POINT DISTANCE GAUGE SYSTEM

TECHNICAL FIELD

The present invention relates to a point-to-point distance gauge for measuring a distance between two points to grasp the distortion of a vehicle body (measuring object), a point-to-point distance gauge system, and a distortion measurement method using the point-to-point distance gauge system.

BACKGROUND ART

To correct the distortion of the vehicle body, it is necessary to accurately grasp the distortion dimension, which indicates the distortion degree of the vehicle body. To measure the distortion of the vehicle body, JP2005-77178A discloses a measuring tool for the vehicle body. In the measuring tool, end portions of a pair of long length arms are pivotally supported, and a measuring pin is provided at the tip portion of each arm.
The measurement pin can be tilted in predetermined directions with the head of the pin as a fulcrum and the tilted state can be maintained. In the vehicle body, one or more holes serving as reference measurement points are formed. A user inserts the conical tip of the measurement pin into the hole to measure the distortion of the vehicle body.

SUMMARY OF THE INVENTION

However, it has been difficult to perform an accurate measurement with the conventional measuring tool described above because the measurement values change when the measurement pin, which is inserted into the reference measurement point (hole), is tilted.

The present invention has been made focusing on such conventional problems. An object of the present invention is to provide a point-to-point distance gauge with excellent workability and a point-to-point distance gauge system, and a distortion measurement method using the point-to-point distance gauge system.

The present invention solves the above problems by the following solution. For better understanding, reference numerals used in the specification are added, but the present invention is not limited to the reference numerals. Further, the configuration described with reference numerals may be appropriately replaced or improved.

The first aspect of the present invention is a point-to-point distance gauge including: a rod-like main body (11) formed by fitting a plurality of cylindrical rods (111, 112, 113) having different diameters with one another so as to be expandable to a desired length; a spherical-tipped shaft (12) provided on one end (113a) of the main body (11) so as to be capable of being folded to a desired angle with respect to the main body (11) and to be capable of maintaining the desired angle, a tip (12a) of the spherical-tipped shaft being formed in a spherical shape having a diameter larger than a shaft diameter; and a conical-tipped shaft (13) provided on the other end (113a) of the main body (11) so as to be capable of being folded to a desired angle with respect to the main body (11) and to be capable of maintaining the desired angle, a tip (13a) of the conical-tipped shaft (13) being formed in a conical shape.

The second aspect of the present invention is the point-to-point distance gauge according to the first aspect of the invention, wherein the one end (113a) of the main body (11) is rotatable around an axial line of the main body, and the spherical-tipped shaft (12) is rotatable around the axial line of the main body together with the one end (113a) of the main body (11).

The third aspect of the present invention is the point-to-point distance gauge according to the first aspect or the second aspect of the invention, wherein the other end (113a) of the main body (11) is rotatable around the axial line of the main body, and the conical-tipped shaft (13) is rotatable around the axial line of the main body together with the other end (113a) of the main body (11).

The fourth aspect of the present invention is the point-to-point distance gauge according to any one of the first aspect to the third aspect of the invention, wherein the spherical-tipped shaft (12) is pivotally supported by a pin (114) provided on the one end (113a) of the main body (11).

The fifth aspect of the present invention is the point-to-point distance gauge according to any one of the first aspect to the fourth aspect of the invention, wherein the conical-tipped shaft (13) is pivotally supported by a pin (114) provided on the other end (113a) of the main body (11).

The sixth aspect of the present invention is the point-to-point distance gauge according to any one of the first aspect to the fifth aspect of the invention, wherein a hinge portion (110) is provided in a middle of the main body (11), and the main body (11) can be folded at the hinge portion.

The seventh aspect of the present invention is the point-to-point distance gauge according to any one of the first aspect to the sixth aspect of the invention, wherein the spherical-shaped tip portion (12a) of the spherical-tipped shaft (12) is made of a ferromagnetic material which is attracted to a magnet.

The eighth aspect of the present invention is a point-to-point distance gauge system including: the point-to-point distance gauge (10) according to the seventh aspect; and an attracting tool (20) configured to be set to a reference point (511) for measuring a dimension of a measuring object, the attracting tool (20) having a magnet (22), an upper surface of the magnet being recessed or perforated to form an attracting area (22a) for attracting the spherical-shaped tip portion (12a) of the spherical-tipped shaft (12).

The ninth aspect of the present invention is the point-to-point distance gauge system according to the eighth aspect of the invention, wherein the attracting tool (20) further has an outer cylinder (21) made of resin configured to hold the magnet (22) on an inner peripheral surface of the outer cylinder (21), a length of the outer cylinder (21) being longer than a thickness of the magnet (22).

The tenth aspect of the present invention is the point-to-point distance gauge system according to the eighth aspect of the invention, wherein the attracting tool (20) further has an outer cylinder (21) made of metal configured to hold the magnet (22) on an inner peripheral surface of the outer cylinder (21), a length of the outer cylinder (21) being longer than a thickness of the magnet (22).

The eleventh aspect of the present invention is the point-to-point distance gauge system according to the eighth aspect of the invention, wherein the attracting tool (20) further has a resin plate (21) configured to hold the magnet (22) and configured to be set to the measuring object.

The twelfth aspect of the present invention is the point-to-point distance gauge system in according to any one of the eighth aspect to the eleventh aspect of the invention, wherein the point-to-point distance gauge system further includes: a measuring tape (30) having a magnet (32), the upper surface of the magnet (32) being recessed or perforated to form the attracting area (32a) for attracting the spherical-shaped tip portion (12a) of the spherical-tipped shaft (12), the magnet (32) being attached on the measuring tape (30) so that a center of the attracting area (32a) is aligned to a zero point of the measuring tape (30).

The thirteenth aspect of the present invention is a method of measuring a distortion of the measuring object using the point-to-point distance gauge system (1) according to any one of the eighth aspect to the twelfth aspect of the invention, wherein the method includes: a normal-side attracting tool setting step (#111) for setting the attracting tool (20) on a normal-side reference point (511) which is symmetrically located with respect to a distortion-side reference point (521) of the measuring object; an adjustment step (#112) for adjusting the point-to-point distance gauge (10) in accordance with a distance between the normal-side reference point (511) and a normal-side measurement point (512) which is symmetrically located with respect to a distortion-side measurement point (522) of the measuring object; a normal-side gauge setting step (#113) for setting the spherical-shaped tip portion (12a) of the spherical-tipped shaft (12) of the point-to-point distance gauge (10) on the magnet (22) of the attracting tool (20) which is set in the normal-side attracting tool setting step (#111); an alignment step (#114) for adjusting a folding angle of the conical-tipped shaft (13) to align the conical-shaped tip portion (13a) of the conical-tipped shaft (13) with the normal-side measurement point (512); a distortion-side attracting tool setting step (#121) for setting the attracting tool (20) on the distortion-side reference point (521); a distortion-side gauge setting step (#122) for setting the spherical-shaped tip portion (12a) of the spherical-tipped shaft (12) on the magnet (22) of the attracting tool (20) which is set in the distortion-side attracting tool setting step (#121) while maintaining a shape of the point-to-point distance gauge (10) which is adjusted in the alignment step (#114); and a distortion measurement step (#123) for measuring the distortion of the measuring object based on a separate distance between the conical-shaped tip portion (13a) of the conical-tipped shaft (13) and the distortion-side measurement point (522).

The fourteenth aspect of the present invention is the method of measuring the distortion according to the thirteenth aspect of the invention, wherein in the normal-side gauge setting step (#113), the spherical-shaped tip portion (12a) of the spherical-tipped shaft (12) is set on the magnet (22) of the attracting tool (20) which is set in the normal-side attracting tool setting step (#111) while adjusting the folding angle of the spherical-tipped shaft (12).

The fifteenth aspect of the present invention is the method of measuring the distortion according to the thirteenth aspect or the fourteenth aspect of the invention, wherein in the distortion measurement step (#123), the distortion of the measuring object is measured based on the separate distance between the conical-shaped tip portion (13a) of the conical-tipped shaft (13) and the distortion-side measurement point (522) by rotating the conical-shaped tip portion (13a) of the conical-tipped shaft (13) around the axial line of the main body (11) while maintaining the folding angle of the conical-tipped shaft (13).

BRIEF DESCRIPTION OF THE DRAWINGS

FIGS. 1A and 1B are drawings showing a point-to-point distance gauge 10 of a point-to-point distance gauge system.

FIGS. 2A, 2B1 and 2B2 are drawings showing an attracting tool 20 of the point-to-point distance gauge system.

FIGS. 17A to 17C are drawings showing a first application of the point-to-point distance gauge 10.

MODES FOR CARRYING OUT THE INVENTION

Figure 3:
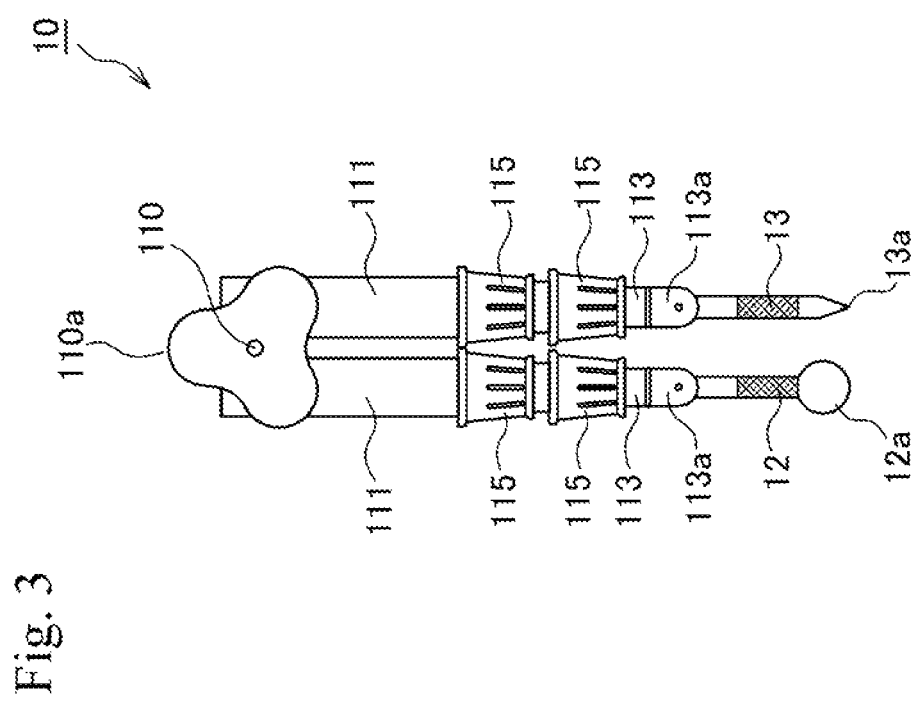
FIG. 3 is a drawing showing a storage state of the point-to-point distance gauge 10.

Hereinafter, embodiments of the present invention will be described with reference to the accompanying drawings.

FIGS. 1A and 1B are drawings showing a point-to-point distance gauge 10 of a point-to-point distance gauge system. FIG. 1A is a whole view and FIG. 1B is a partially enlarged view.

The point-to-point distance gauge system 1 includes the point-to-point distance gauge (tracking gauge) 10 and an attracting tool 20.

As shown in FIG. 1A, the point-to-point distance gauge 10 includes a body 11, a spherical-tipped shaft 12, and a conical-tipped shaft 13.

The body 11 of the present embodiment is provided with a hinge portion 110 in a middle of the body 11 and the body 11 can be folded at the hinge portion 110. On both sides across the hinge portion 110, cylindrical large diameter rods 111, medium diameter rods 112, and small diameter rods 113 are sequentially fitted. The folding center axis of the hinge portion 110 is a bolt, and a knob 110a is provided at the tip of this bolt. When the knob 110a is turned and the bolt is loosened, the large diameter rods 111 on both sides become freely rotatable. When the knob 110a is turned and the bolt is tightened, the large diameter rods 111 on both sides are fixed.

At the tip of the large diameter rod 111 and the medium diameter rod 112, adjusters 115 are provided. First, the adjuster 115 will be described using the large diameter rod 111 as an example.

The adjuster 115 has an inner sleeve 1151 and an outer sleeve 1152.

As shown in FIG. 1B, the inner sleeve 1151 is fixed to the tip of the large diameter rod 111. The inner sleeve 1151 is made of resin, for example. A male screw is formed on a circumference surface 1151a on a terminal side of the inner sleeve 1151. A slit 1151b is formed on the tip side of the inner sleeve 1151, and the tip of the inner sleeve is movable so as to be narrowed in the radial direction. The medium diameter rod 112 is inserted into the large diameter rod 111 by being passed through the inner sleeve 1151. A female screw which is screwed with the male screw of the inner sleeve 1151 is formed on an inner peripheral surface of the outer sleeve 1152 on the terminal side. Also, the outer sleeve 1152 is formed to be tapered. With such a structure, when the outer sleeve 1152 is tightened, the tip of the inner sleeve 1151 is narrowed to fix the medium diameter rod 112. When the outer sleeve 1152 is loosened, the tip of the inner sleeve 1151 is expanded and the medium diameter rod 112 becomes freely rotatable and slidable.

The adjuster 115 is also provided on the tip of the medium diameter rod 112. When the outer sleeve 1152 is tightened, the small diameter rod 113 is fixed. When the outer sleeve 1152 is loosened, the small diameter rod 113 becomes freely rotatable and slidable.

In the small diameter rod 113, the end 113a is slidably rotatable around an axis and the end 113a can be frictionally held at a desired rotation angle.

A spherical-tipped shaft 12 has a tip 12a which is formed in a spherical shape having a larger diameter than a shaft diameter. Near the spherical-shaped tip portion 12a of the spherical-tipped shaft 12, a knurling process is applied to prevent slipping. The spherical-tipped shaft 12 is pivotally supported by a pin 114. The pin 114 is fixed to the end 113a of the small diameter rod 113 on one side (on the left side in FIG. 1). The spherical-tipped shaft 12 is slidably rotatable around the pin 114. The spherical-tipped shaft 12 can be folded at a desired angle (arbitrary angle) with respect to the small diameter rod 113 and frictionally held at the desired angle (arbitrary angle). The pin 114 may be a bolt. When the bolt is used, the spherical-tipped shaft 12 can be folded and fixed by tightening and loosening the bolt. As described above, since the end 113a of the small diameter rod 113 can rotate around the axis, when a force is applied to the spherical-tipped shaft 12, the spherical-tipped shaft 12 is rotated around the axis of the small diameter rod 113 together with the end 113a of the small diameter rod 113. The spherical-shaped tip portion 12a of the spherical-tipped shaft 12 is made of a ferromagnetic material attracted by the magnet 22. For example, the spherical-shaped tip portion 12a is made of iron.

A conical-tipped shaft 13 has a tip 13a which has a conical shape. Near the conical-shaped tip portion 13a of the conical-tipped shaft 13, a knurling process is applied to prevent slipping. The conical-tipped shaft 13 is pivotally supported by a pin 114. The pin 114 is fixed to the end 113a of the small diameter rod 113 on the other side (on the right side in FIG. 1). The conical-tipped shaft 13 is slidably rotatable around the pin 114. The conical-tipped shaft 13 can be folded at a desired angle with respect to the small diameter rod 113 and frictionally held at the desired angle. The pin 114 may also be a bolt. When the bolt is used, the conical-tipped shaft 13 can be folded and fixed by tightening and loosening the bolt. As described above, since the end 113a of the small diameter rod 113 can rotate around the axis, when a force is applied to the conical-tipped shaft 13, the conical-tipped shaft 13 is rotated around the axis of the small diameter rod 113 together with the end 113a of the small diameter rod 113.

FIGS. 2A, 2B1 and 2B2 are drawings showing the attracting tool 20 of the point-to-point distance gauge system. FIG. 2A is a perspective view of one type of the attracting tool 20 which is set to a bolt head or the like. FIG. 2B1 is a perspective view of another type of the attracting tool 20 which is set to a hole or the like. FIG. 2B2 is a plan view of FIG. 2B1.

The attracting tool 20 is a member attached to a reference point which is used when a distance between two points is measured for measuring distortion and the like of a vehicle body (measuring object).

The attracting tool 20 shown in FIG. 2A is one type of the attracting tool which is set to a bolt head or the like. The attracting tool 20 has an outer cylinder 21 and a magnet 22.

The outer cylinder 21 is, for example, a resin tube having elasticity. The outer cylinder 21 is longer than the thickness of the magnet 22. The inner diameter is slightly smaller than the outer diameter of the magnet 22 and the inner diameter is approximately the same as or slightly smaller than the diameter of the bolt head which is a reference point.

The magnet 22 attracts the spherical-shaped tip portion 12a of the spherical-tipped shaft 12 of the point-to-point distance gauge 10. The upper surface of the magnet 22 is recessed or perforated. The recessed or perforated portion is an attracting area 22a which attracts the spherical-shaped tip portion 12a of the spherical-tipped shaft 12. The outer diameter of the magnet 22 is slightly larger than the inner diameter of the outer cylinder 21. The outer diameter of the magnet 22 is substantially the same as or slightly larger than the diameter of the bolt head which is the reference point. The thickness of the magnet 22 is thinner than the length of the outer cylinder 21. The magnet 22 is inserted into the outer cylinder 21 so that the upper surface of the magnet 22 is arranged to substantially coincide with the upper end surface of the outer cylinder 21 and the magnet 22 is held by the inner peripheral surface of the outer cylinder 21. Then, the outer cylinder 21 is extended to below the magnet 22. By attaching the extended part to the bolt head so as to cover the bolt head, which is the reference point when measuring the distortion of the vehicle body, the attracting tool 20 is firmly attached to the bolt, which is the reference point when measuring the distortion of the vehicle body. Since various sizes of bolts are used for a vehicle, it is encouraged to prepare various sizes of the attracting tools 20 conforming to the bolts.

The outer cylinder 21 may be a metal cylinder, for example. In this case, the inner diameter is the same as the outer diameter of the magnet 22, and the inner diameter is the same as or slightly larger than the diameter of the bolt head which is the reference point. When the outer cylinder 21 is made of metal, the durability is increased.

The attracting tool 20 shown in FIG. 2B1 and FIG. 2B2 is another type of the attracting tool which is set in a hole or the like. The attracting tool 20 has a resin plate 21 and a magnet 22.

The resin plate 21 is a transparent or translucent thin plate made of resin. The magnet 22 is adhered to the resin plate 21. The resin plate 21 is larger than the magnet 22, and one or more markers 21a are concentrically engraved around the magnet 22 while centering on the center of the magnet 22. In FIGS. 2B1 and 2B2, three rows of the markers 21a are shown but the number of the rows is only an example. The number of rows may be one, two, four or more.

The magnet 22 attracts the spherical-shaped tip portion 12a of the spherical-tipped shaft 12 of the point-to-point distance gauge 10. The magnet 22 is recessed or perforated on the upper surface, and the attracting area 22a attracts the spherical-shaped tip portion 12a of the spherical-tipped shaft 12. The magnet 22 is adhered approximately at the center of the resin plate 21.

(Use Method 1 of Point-to-Point Distance Gauge System)

FIG. 3 is a drawing showing the storage condition of the point-to-point distance gauge 10.

In the point-to-point distance gauge 10, in the storage state, the medium diameter rod 112 is housed in the large diameter rod 111, and the small diameter rod 113 is housed in the medium diameter rod 112.

When the point-to-point distance gauge 10 is used, the knob 110a of the point-to-point distance gauge 10 is loosened and the body 11 (large diameter rods 111) is made to be straight at the hinge portion 110, and then the knob 110a is tightened. In addition, the outer sleeves 1152 are loosened and the medium diameter rods 112 and small diameter rods 113 are extended, and then the outer sleeve 1152 are tightened. Further, the spherical-tipped shaft 12 and the conical-tipped shaft 13 are folded (tilted) to be about 90 degrees with respect to the body 11. Accordingly, the state shown in FIG. 1 is obtained.

Figure 4:
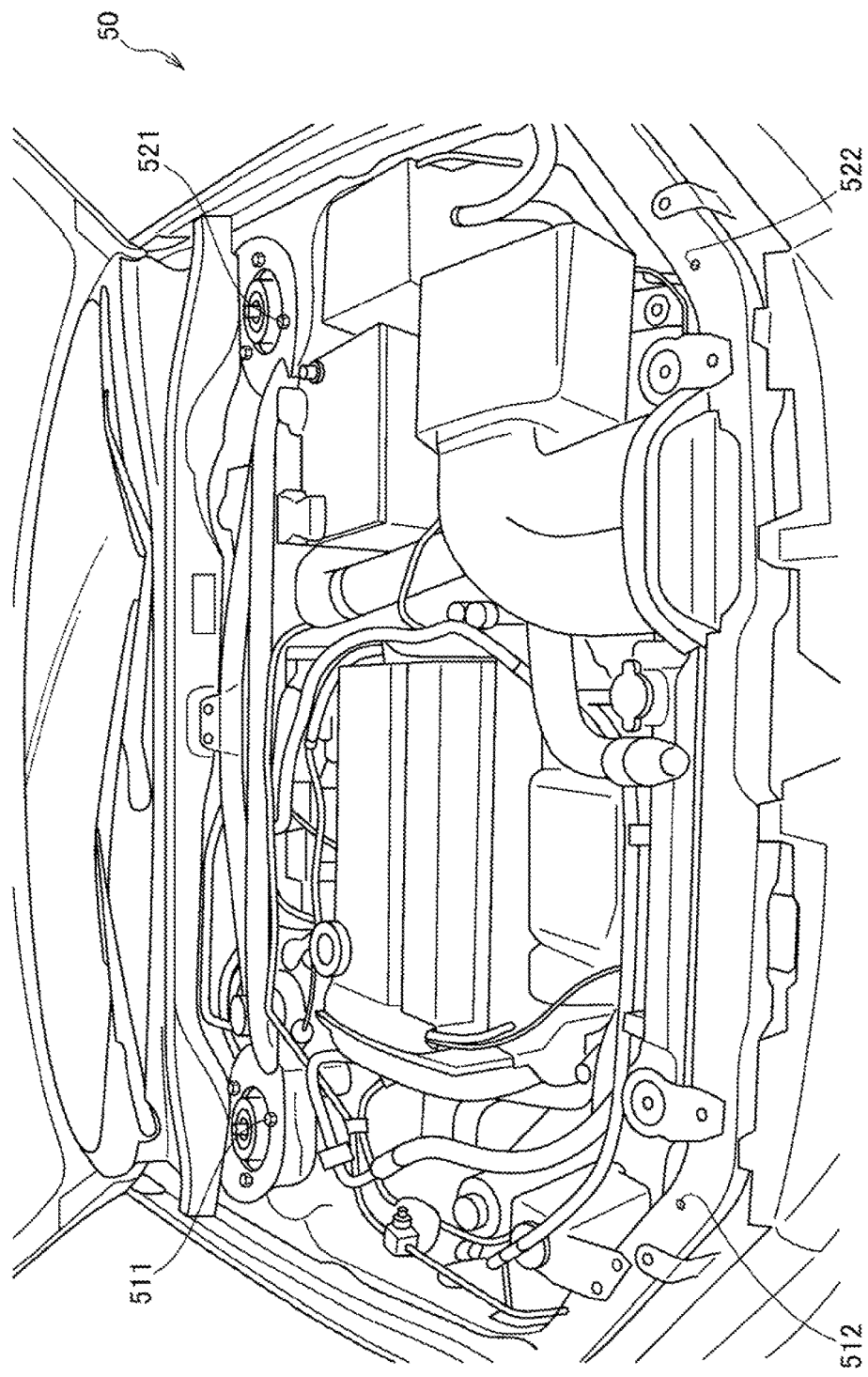
FIG. 4 is a drawing showing an example of an engine room 50.

When measuring a distortion of an engine room 50 shown in FIG. 4, for example, the point-to-point distance gauge 10 is used as follows.

Figure 5:
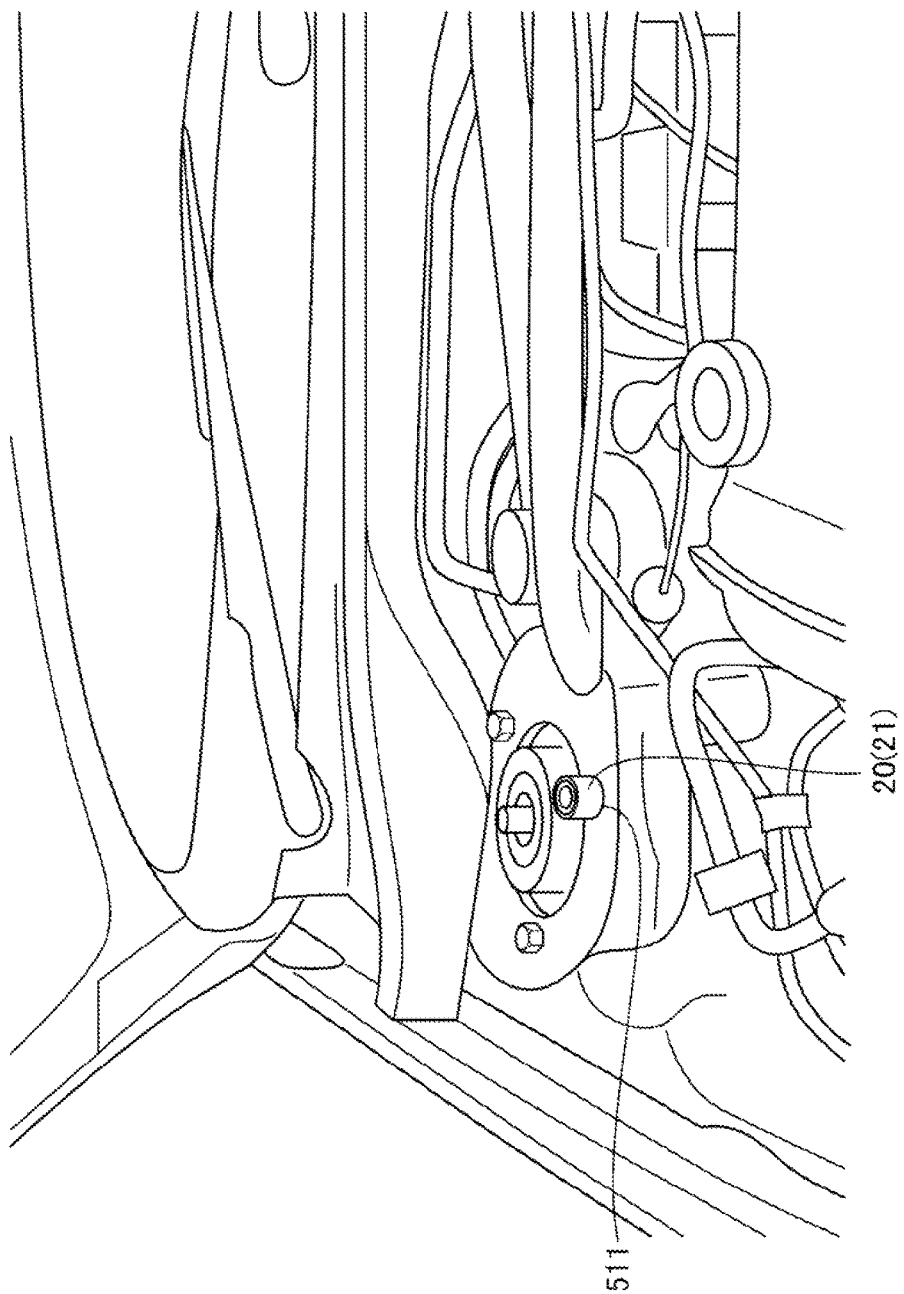
FIG. 5 is a drawing showing a state where the attracting tool 20 is set in a normal-side reference point 511 which is provided in the engine room.

First, as shown in FIG. 5, the outer cylinder 21 of the attracting tool 20 shown in FIG. 2A is set so as to cover a normal-side reference point (bolt head at the top of the wheel housing) 511, which is symmetrically located with respect to a distortion-side reference point 521 on the distortion-side of the vehicle body (measuring object). This step corresponds to a normal-side attracting tool setting step #111.

Next, the length of the body 11 of the point-to-point distance gauge 10 is adjusted in accordance with the distance between the normal-side reference point 511 and a normal-side measurement point 512, which is symmetrically located with respect to a distortion-side measurement point 522 of the vehicle body, and a folding angle (tilt angle) of the spherical-tipped shaft 12 is adjusted if necessary. This step corresponds to an adjustment step #112. When there is no obstacle around the normal-side reference point 511, the spherical-tipped shaft 12 is preferably folded 90 degrees with respect to the body 11. Note that the normal-side attracting tool setting step #111 and the length adjustment step #112 may be performed in reverse order.

Then, the spherical-shaped tip portion 12a of the spherical-tipped shaft 12 of the point-to-point distance gauge 10 is set on the magnet 22 of the attracting tool 20, which is set in the normal-side attracting tool setting step #111. This step corresponds to a normal-side gauge setting step #113.

Figure 6:
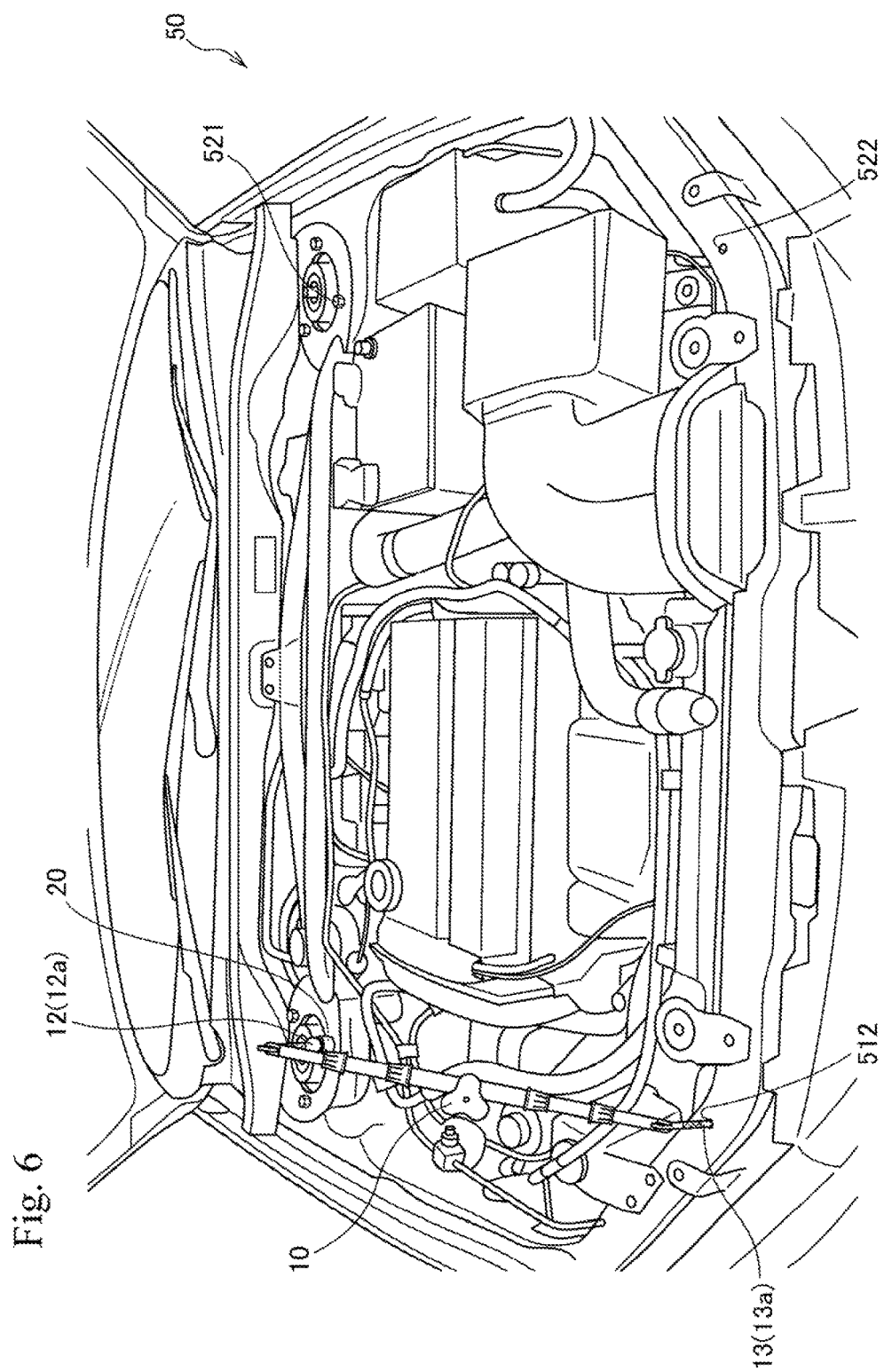
FIG. 6 is a drawing showing a state where a conical-shaped tip portion 13a of a conical-tipped shaft 13 is aligned with the normal-side measurement point 512.

Subsequently, a folding angle of the conical-tipped shaft 13 is adjusted so that the conical-shaped tip portion 13a of the conical-tipped shaft 13 is aligned with the normal-side measurement point 512. This step corresponds to as an alignment step #114. This configuration is shown in FIG. 6.

Next, the attracting tool 20 is set to the distortion-side reference point 521. This step corresponds to a distortion-side attracting tool setting step #121.

Then, the spherical-shaped tip portion 12a of the spherical-tipped shaft 12 is set on the magnet 22 of the attracting tool 20, which is set in the distortion-side attracting tool setting step #121, while maintaining the shape of the point-to-point distance gauge 10, which is adjusted in the alignment step #114. This step corresponds to a distortion-side gauge setting step #122.

Figure 7:
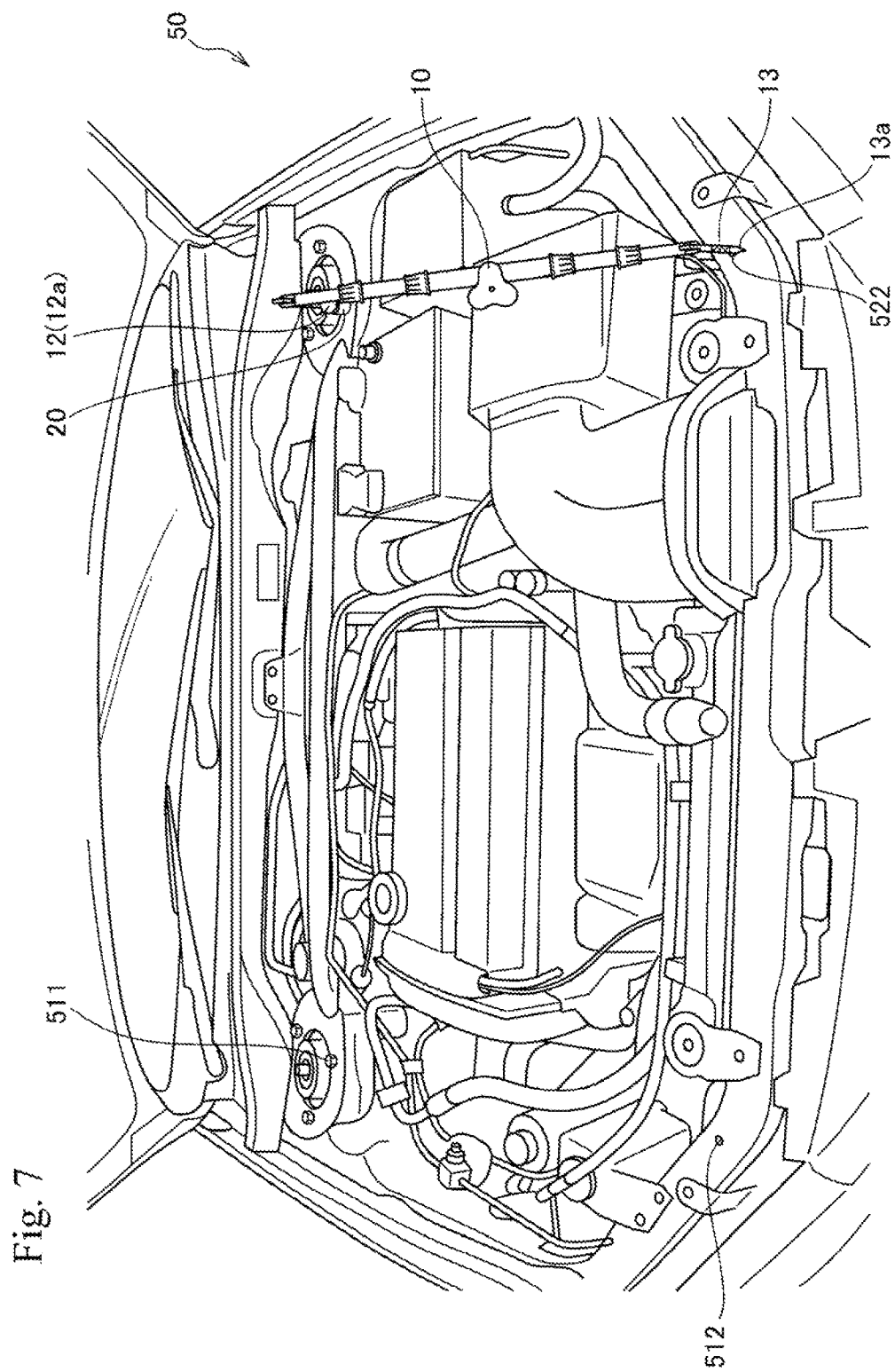
FIG. 7 is a drawing showing a state where a distortion of a vehicle body is measured by aligning the conical-shaped tip portion 13a of the conical-tipped shaft 13 with the distortion-side measurement point 522.

After that, as shown in FIG. 7, the conical-shaped tip portion 13a of the conical-tipped shaft 13 is moved close to the distortion-side measurement point 522 while maintaining the shape of the point-to-point distance gauge 10, which is aligned in the alignment step #114. Thus, the distortion of the vehicle body is measured based on the separate distance between the distortion-side measurement point 522 and the conical-shaped tip portion 13a of the conical-tipped shaft 13. This step corresponds to a distortion measurement step #123. In FIG. 7, the conical-shaped tip portion 13a of the conical-tipped shaft 13 is located in front of the distortion-side measurement point 522. Therefore, it can be understood that the front portion of the vehicle body is backwardly deformed. In addition, the deformation amount can be grasped based on the separate distance between the conical-shaped tip portion 13a of the conical-tipped shaft 13 and the distortion-side measurement point 522.

(Use Method 2 of Point-to-Point Distance Gauge System)

In the use method 1 described above, it is not particularly necessary to rotate the conical-tipped shaft 13 around the axial line of the body 11. However, depending on the measurement location, it is necessary to rotate the conical-tipped shaft 13 around the axial line of the body 11. According to the point-to-point distance gauge 10 of the present embodiment, a distortion can also be measured in such a case. For example, when a vehicle is moved back with the rear gate open and the vehicle is hit against the wall, the vicinity of the rear gate may be distorted. Here, using such a situation as an example, the distortion measurement will be explained.

Figure 8:
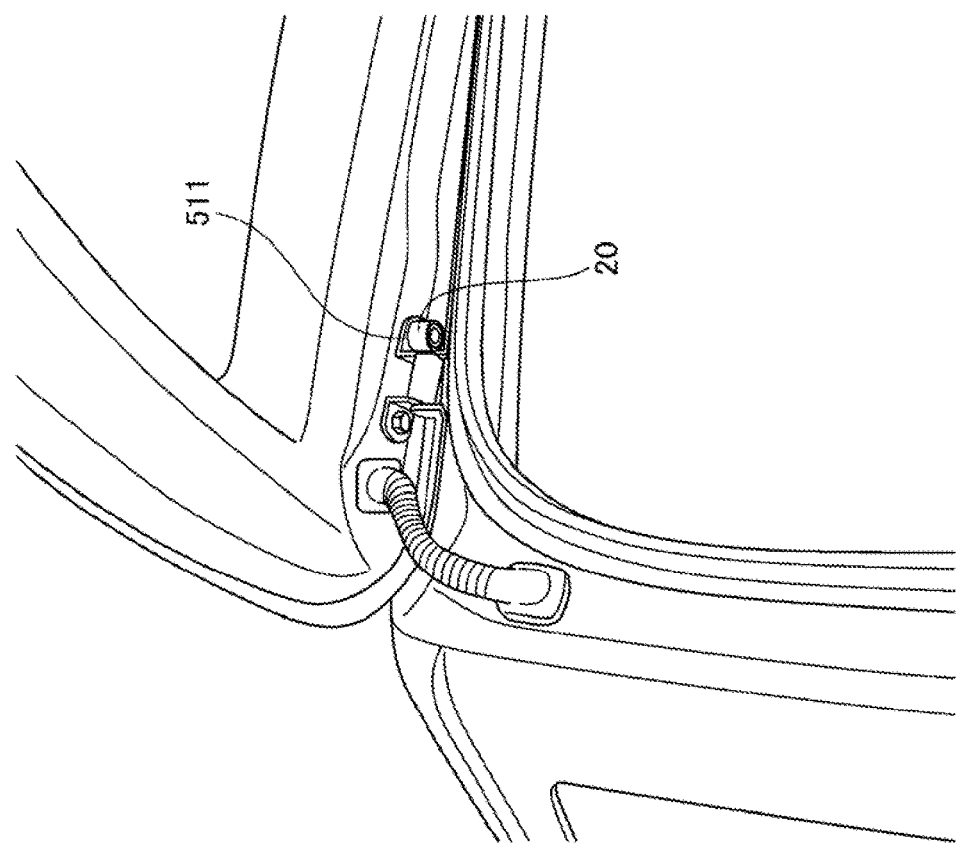
FIG. 8 is a drawing showing a state where the attracting tool 20 is set on the normal-side reference point 511 which is provided near a rear gate.

First, as shown in FIG. 8, the attracting tool 20 shown in FIG. 2A is set to the normal-side reference point 511 (bolt head fixing the hinge of the rear gate), which is symmetrically located with respect to the distortion-side reference point 521. This step corresponds to the normal-side attracting tool setting step #111.

Next, the length of the body 11 of the point-to-point distance gauge 10 is adjusted in accordance with the distance between the normal-side reference point 511 and the normal-side measurement point 512, which is symmetrically located with respect to the distortion-side measurement point 522 of the vehicle body, and a folding angle of the spherical-tipped shaft 12 is adjusted if necessary. This step corresponds to the adjustment step #112. When there is no obstacle around the normal-side reference point 511, the spherical-tipped shaft 12 is folded at 90 degrees with respect to the body 11. Note that the normal-side attracting tool setting step #111 and the length adjustment step #112 may be performed in reverse order.

Figure 9:
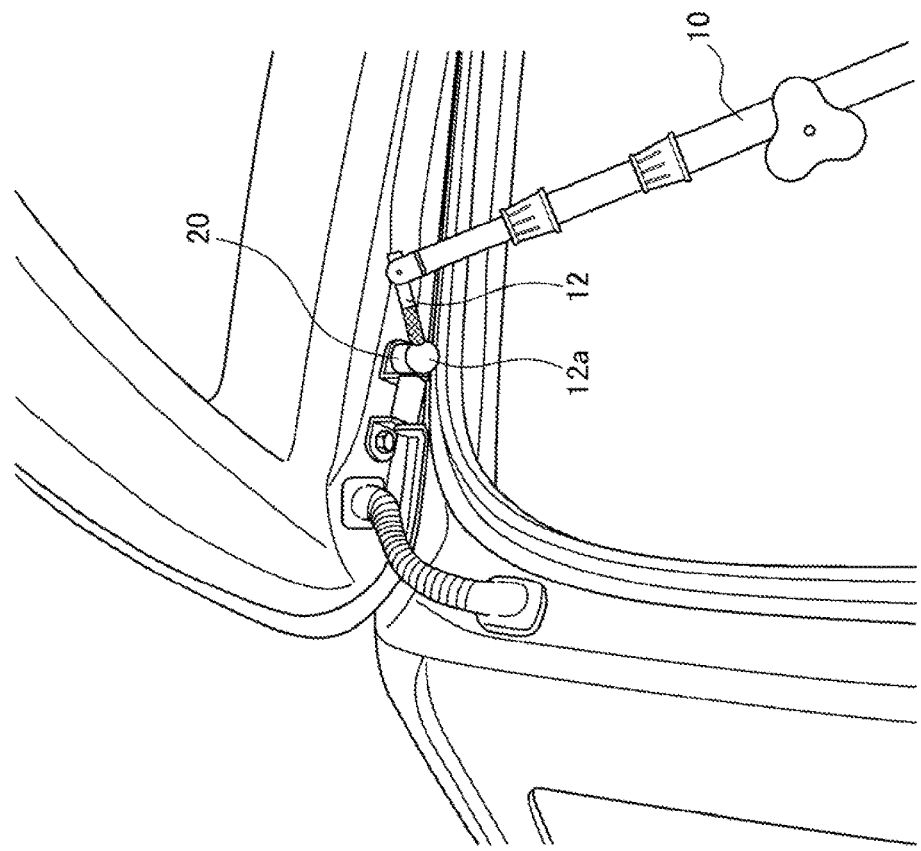
FIG. 9 is a drawing showing a state where a spherical-shaped tip portion 12a of a spherical-tipped shaft 12 of the point-to-point distance gauge 10 is set on the attracting tool 20.

Then, as shown in FIG. 9, the spherical-shaped tip portion 12a of the spherical-tipped shaft 12 of the point-to-point distance gauge 10 is set to the magnet 22 of the attracting tool 20, which is set in the normal-side attracting tool setting step #111. This step corresponds to the normal-side gauge setting step #113.

Next, the conical-tipped shaft 13 is rotated around the axial line of the body 11 to move the conical-shaped tip portion 13*a* of the conical-tipped shaft 13 close to the normal-side measurement point 512. This step corresponds to a normal-side shaft rotation step #113-2.

Figure 10:
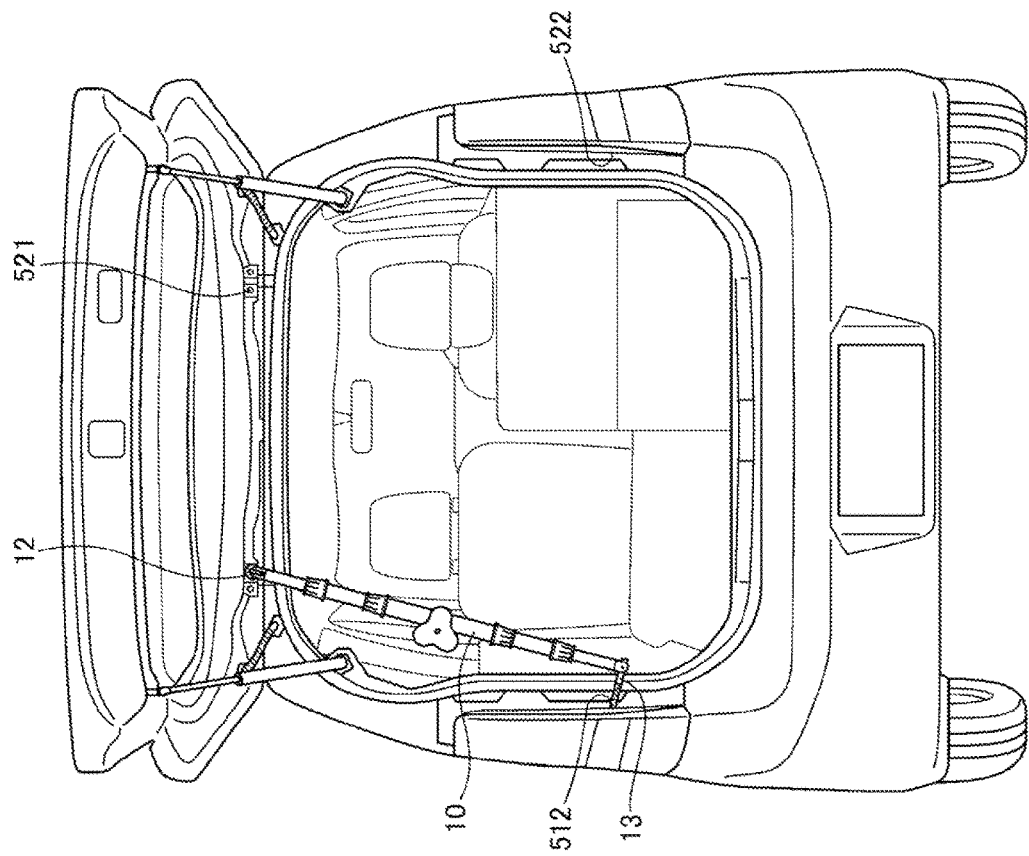
FIG. 10 is a drawing showing a state where the conical-shaped tip portion 13a of the conical-tipped shaft 13 is aligned with the normal-side measurement point 512.

Subsequently, the folding angle of the conical-tipped shaft 13 is adjusted to align the conical-shaped tip portion 13*a* of the conical-tipped shaft 13 with the normal-side measurement point 512. This step corresponds to the alignment step #114. This configuration is shown in FIG. 10

Subsequently, the attracting tool 20 is set to the distortion-side reference point 521. This step corresponds to the distortion-side attracting tool setting step #121.

Then, the spherical-shaped tip portion 12*a* of the spherical-tipped shaft 12 is set on the magnet 22 of the attracting tool 20, which is set in the distortion-side attracting tool setting step #121, while maintaining the shape of the point-to-point distance gauge 10, which is adjusted in the alignment step #114. This step corresponds to the distortion-side gauge setting step #122.

Subsequently, the conical-tipped shaft 13 is rotated around the axial line of the body 11 in the opposite direction to the direction of the normal-side shaft rotation step #113-2 to move the conical-shaped tip portion 13*a* of the conical-tipped shaft 13 close to the distortion-side measurement point. This step corresponds to a distortion-side shaft rotation step #122-2.

Figure 11:
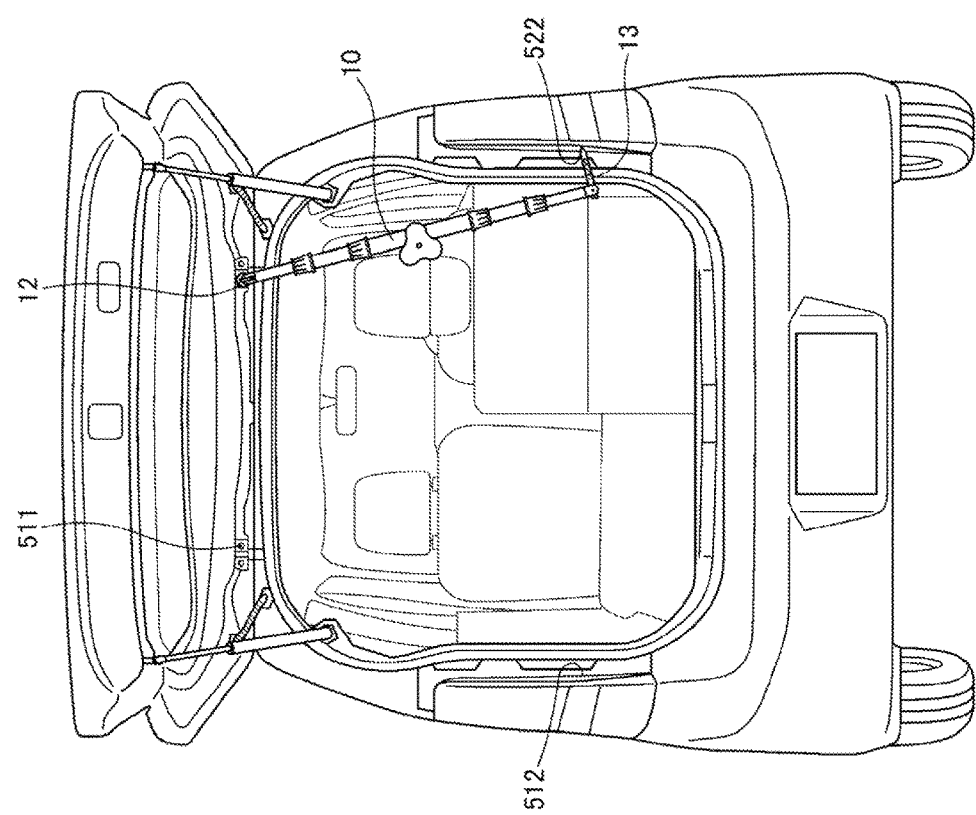
FIG. 11 is a drawing showing a state where the distortion of the vehicle body is measured by aligning the conical-shaped tip portion 13a of the conical-tipped shaft 13 with the distortion-side measurement point 522.
Figure 12:
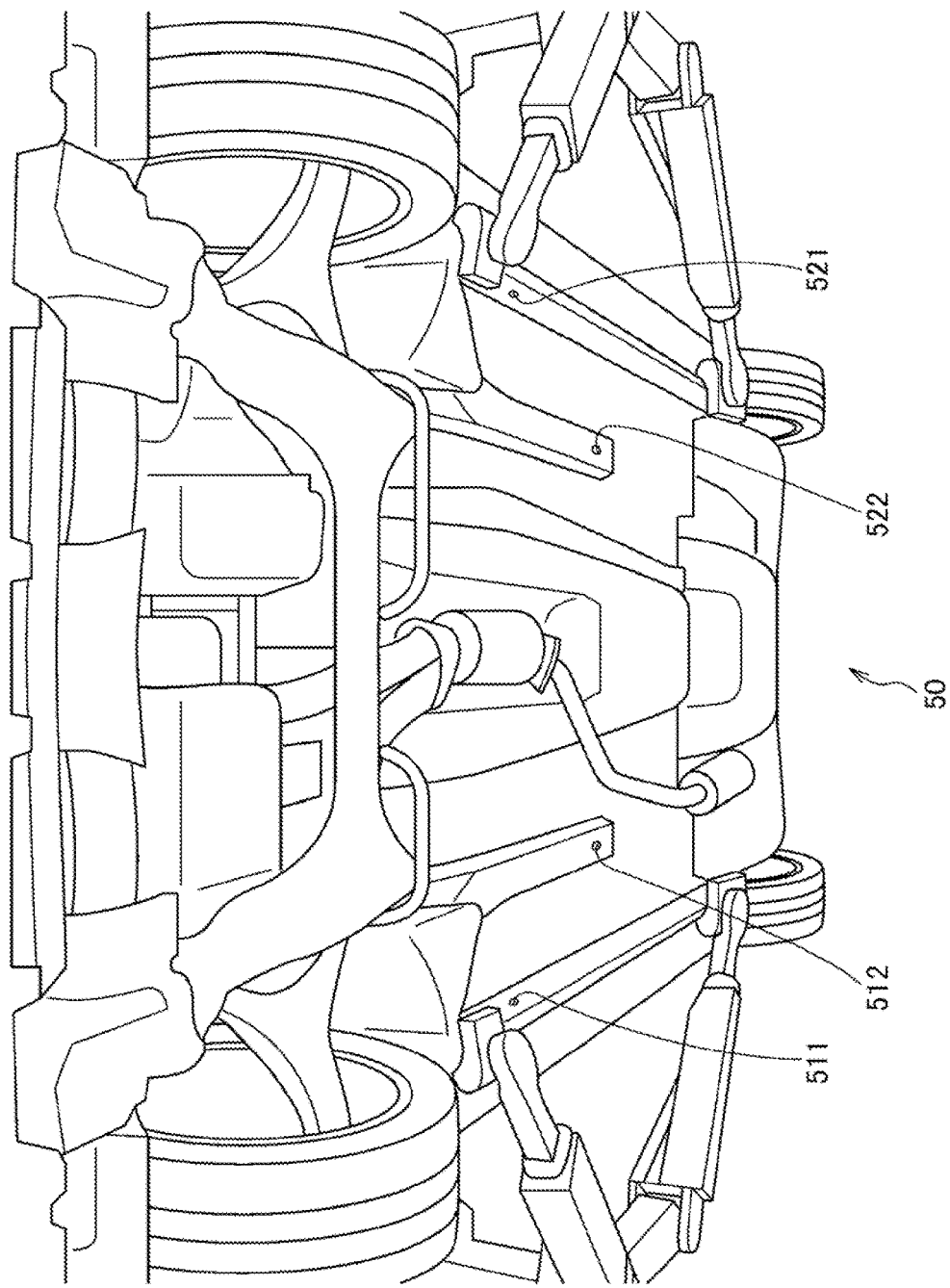
FIG. 12 is a drawing showing an example of an underfloor 50.

As shown in FIG. 11, the distortion of the vehicle body is measured based on the separate distance between the distortion-side measurement point and the conical-shaped tip portion 13*a* of the conical-tipped shaft 13. This step corresponds to the distortion measurement step #123.

(Use Method 3 of Point-to-Point Distance Gauge System)

According to the point-to-point distance gauge system of the present embodiment, the distortion of an underfloor 50 can be easily measured.

Figure 13:
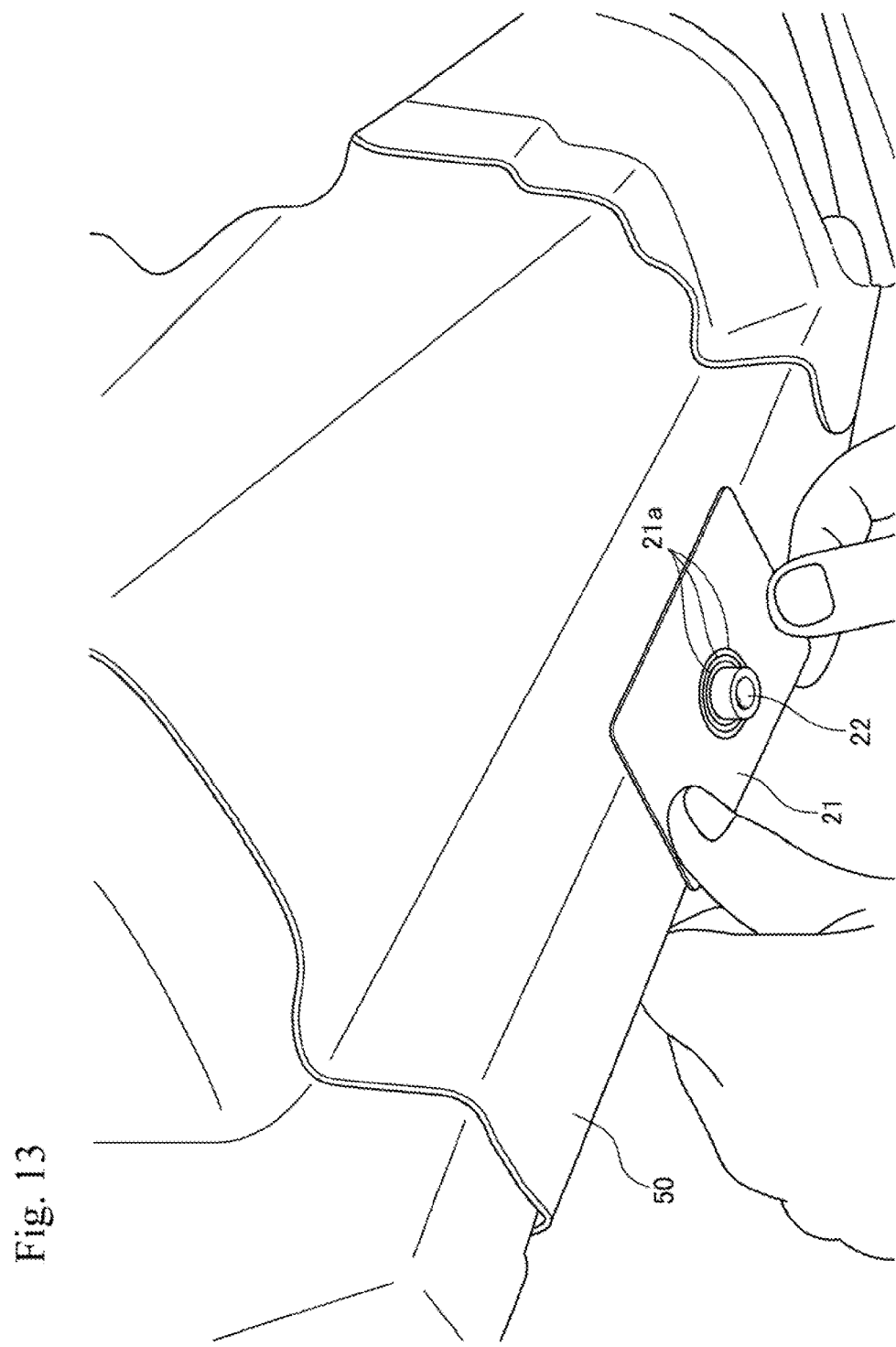
FIG. 13 is a drawing showing a state where a center of the magnet 22 is aligned with a center of the reference point (hole).
Figure 14:
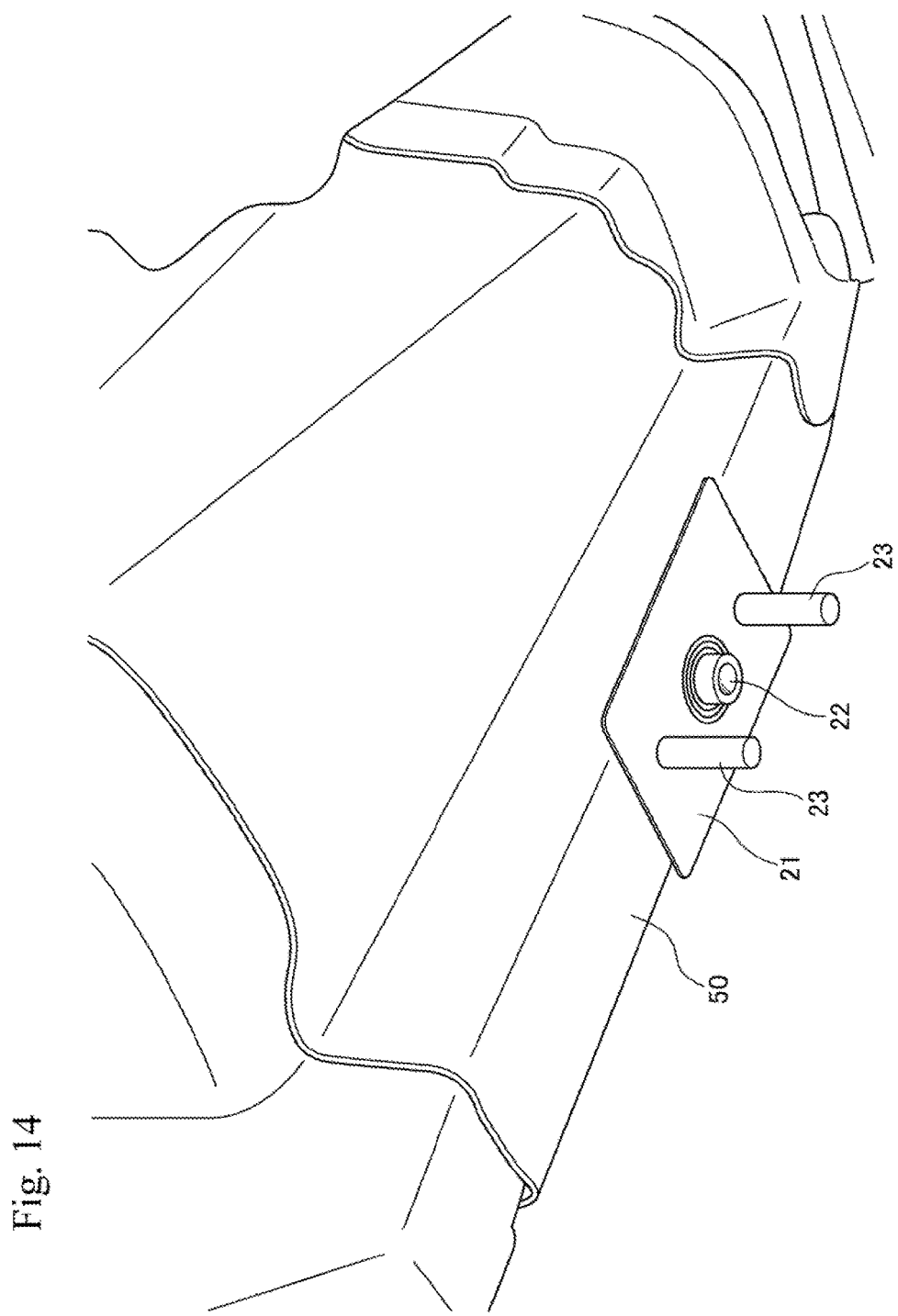
FIG. 14 is a drawing showing a state where the attracting tool 20 is set on the underfloor.

When the reference point is a hole, the attracting tool 20 shown in FIGS. 2B1 and 2B2 is set to the normal-side reference point 511, which is symmetrically located with respect to the distortion-side reference point 521. This step corresponds to the normal-side attracting tool setting step #111. Since the resin plate 21 of the attracting tool 20 is transparent or translucent, when the resin plate 21 is overlapped on the reference point (hole) 511, the hole 511 can be seen through. In this state, the center of the magnet 22 is aligned with the center of the hole 511 while the marker 21*a* is used as a guide as shown in FIG. 13. Then, as shown in FIG. 14, the attracting tool 20 is set by fixing the resin plate 21 to the underfloor using one or more magnets 23. This step corresponds to the normal-side attracting tool setting step #111.

Thereafter, similarly to the use method 1, the length of the body 11 of the point-to-point distance gauge 10 is adjusted in accordance with the distance between the normal-side reference point 511 and the normal-side measurement point 512, which is symmetrically located with respect to the distortion-side measurement point 522 of the vehicle body, and a folding angle of the spherical-tipped shaft 12 is adjusted if necessary. This step corresponds to the adjustment step #112. Then, the spherical-shaped tip portion 12*a* of the spherical-tipped shaft 12 of the point-to-point distance gauge 10 is set on the magnet 22 of the attracting tool 20. This step corresponds to the normal-side gauge setting step #113. Subsequently, the folding angle of the conical-tipped shaft 13 is adjusted to align the conical-shaped tip portion 13*a* of the conical-tipped shaft 13 with the normal-side measurement point 512. This step corresponds to the alignment step #114. Next, the resin plate 21 of the attracting tool 20 shown in FIGS. 2B1 and 2B2 is set to the distortion-side reference point 521 using one or more magnets 23. This step corresponds to the distortion-side attracting tool setting step #121. This procedure is similar to the procedure of the normal-side attracting tool setting step #111. Next, the spherical-shaped tip portion 12*a* of the spherical-tipped shaft 12 is set on the magnet 22 of the attracting tool 20 while maintaining the shape of the point-to-point distance gauge 10. This step corresponds to the distortion-side gauge setting step #122. Then, the conical-shaped tip portion 13*a* of the conical-tipped shaft 13 is moved close to the distortion-side measurement point, and the distortion of the vehicle body is measured based on the separate distance between the distortion-side measurement point and the conical-shaped tip portion 13*a* of the conical-tipped shaft 13. This step corresponds to the distortion measurement step #123.

If necessary, the conical-tipped shaft 13 may be rotated in the same way as the use method 2 (normal-side shaft rotation step #113-2 and distortion-side shaft rotation step #122-2).

(Use Method of Point-to-Point Distance Gauge as Single Body)

In the vehicle body, there are many holes which may be used as a reference measurement point. Also in the engine room, there are also many holes, which may be used as the reference measurement point. Therefore, the spherical-shaped tip portion 12*a* of the spherical-tipped shaft 12 of the point-to-point distance gauge 10 may be set directly to the hole without using the attracting tool 20. In this case, when the spherical-shaped tip portion 12*a* is made of magnet, the point-to-point distance gauge becomes much easier to be used.

(Operation and Effect)

Conventionally, the distortion of a vehicle body is measured by inserting a conical tip of the measurement pin into a hole which is formed in the vehicle body and used as a reference measurement point. Even in this method, the measurement can be accurate only when the measurement pin is upright in the normal direction of the hole, because a whole circumference of the measurement pin is in contact with the hole and the insertion amount of the measurement pin is always constant. However, in an actual site, especially when only one worker conducts the measurement, it is difficult to keep the measurement pin upright in the normal direction of the hole, and the measurement pin may tilt. Then, the measurement pin may be supported by two point-contacts; one certain point and the other point opposed to the certain point. In such a case, the insertion amount of the measurement pin varies and eventually, the measurement amount also varies.

On the other hand, in the present embodiment, spherical-tipped shaft whose tip has a spherical shape is provided at one end of the body. Since the tip has a spherical shape, even if the shaft is inclined, the spherical tip portion abuts on the hole or the attracting tool 20, which is the reference measurement point, with a constant contact amount. Therefore, even when the shaft tilts, the measurement amount does not vary.

Further, in the present embodiment, the end 113*a* is slidably rotatable around the axis and the end 113*a* can be frictionally held at a desired rotation angle. Therefore, when a force is applied to the spherical-tipped shaft 12 and the conical-tipped shaft 13, the spherical-tipped shaft 12 and the conical-tipped shaft 13 rotate around the axis of the small diameter rod 113 together with the end 113a of the small diameter rod 113. Therefore, even when the measurement point is positioned laterally to the reference point, for example, the measurement can be achieved by rotating the direction of spherical-tipped shaft 12 and conical-tipped shaft 13 as in the case of the use method 2 described above.

Figure 15:
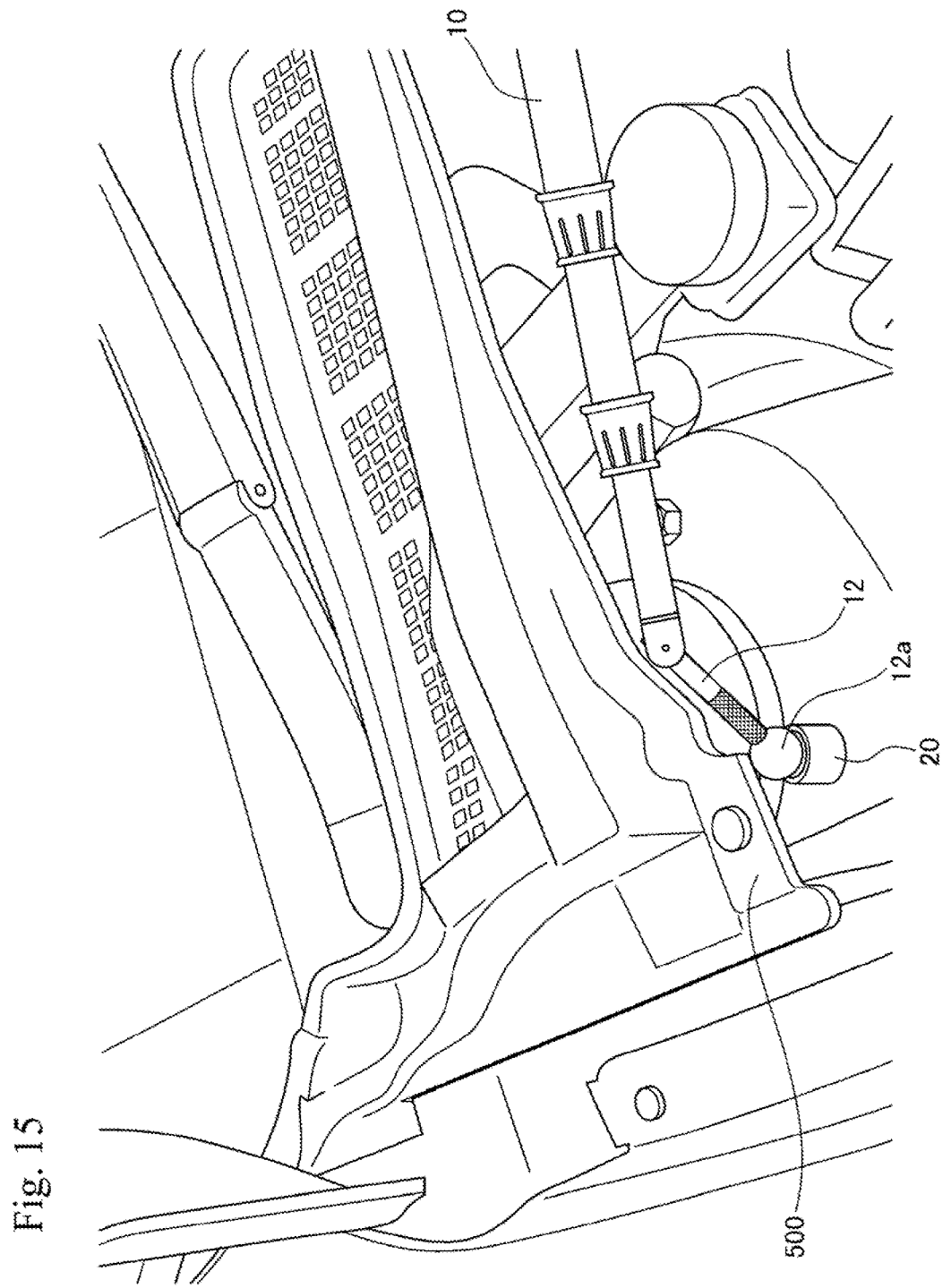
FIG. 15 is a drawing showing a state where the spherical-shaped tip portion 12a of the spherical-tipped shaft 12 is set by avoiding an obstacle 500 when there is the obstacle 500 such as a panel is present around the normal-side reference point 511.

Furthermore, in the present embodiment, the spherical-tipped shaft 12 and the conical-tipped shaft 13 are pivotally supported by the pins 114 which are fixed to the both ends 113a of the body 11 (small diameter rods 113). Thus, the spherical-tipped shaft 12 and the conical-tipped shaft 13 can be folded to a desired angle and frictionally held at the desired angle. Therefore, as shown in FIG. 15 for example, even when it is difficult to set the spherical-tipped shaft 12 upright due to an obstacle 500 such as a panel above the reference point, which is used during the distortion measurement of a vehicle body, the distortion measurement of the vehicle body can be achieved by properly tilting the spherical-tipped shaft 12.

Also, in the middle of the body 11, the hinge portion 110 is provided and the body 11 can be folded at the hinge portion 110. Therefore, by folding the body 11 at the hinge portion 110, the body 11 can be escaped from peripheral components so that the body 11 does not interfere with the peripheral components. If the reference point and the measurement point are close to each other, it is possible to measure the distortion of the vehicle body by folding the body 11 at the hinge portion 110 and by using the body 11 like a compass.

In the attracting tool 20, the upper surface is recessed or perforated to form the attracting area for attracting the spherical-shaped tip portion 12a of the spherical-tipped shaft 12. Also, the spherical-shaped tip portion 12a of the spherical-tipped shaft 12 is made of a ferromagnetic material, which is attracted to the magnet 22. Since the spherical-shaped tip portion 12a of the spherical-tipped shaft 12 is attracted to the attracting area, there is no positional displacement of the spherical-tipped shaft 12. Furthermore, since the tip portion 12a of the spherical-tipped shaft 12 has a spherical shape, the shaft is easily tilted so that the shaft does not interfere with the peripheral components. In addition, since the tip portion 12a is attracted by the magnet 22, the positional displacement does not occur when the shaft is tilted. Therefore, accurate measurement can be achieved even when only one user conducts the measurement.

The magnet 22 is inserted into the outer cylinder 21 and held by the outer cylinder 21. The outer cylinder 21 is longer than the thickness of the magnet 22. With this configuration, the magnet 22 can be easily set on a bolt head, which is the reference point, by covering the bolt head with the outer cylinder 21. When the outer cylinder 21 is made of resin having elasticity and the inner diameter is slightly smaller than the outer diameter of the magnet 22 and the inner diameter is approximately the same as or slightly smaller than the diameter of the bolt head, which is the reference point, the attracting tool 20 is firmly fixed to the bolt. When the outer cylinder 21 is made of metal, the durability is increased.

In another embodiment, the magnet 22 is fixed on the resin plate 21. The resin plate 21 is transparent or translucent and larger than the magnet 22. One or more markers 21a are concentrically engraved around the magnet 22 while centering on the center of the magnet 22. With this configuration, when the resin plate 21 covers a hole which is used as the reference point, the hole can be seen through. In this state, it is possible to align the center of the magnet 22 with the center of the hole 511 while the marker 21a is used as a guide. Thus, the attracting tool 20 can be easily set by fixing the resin plate 21 on the vehicle body using one or more magnets 23.

The attracting tool 20 is set to the normal-side reference point, which is symmetrically located with respect to the distortion-side reference point. Then, the spherical-shaped tip portion 12a of the spherical-tipped shaft 12 of the point-to-point distance gauge 10 is set on the magnet 22 of the attracting tool 20. Then, the conical-shaped tip portion 13a of the conical-tipped shaft 13 is set to the normal-side measurement point. With such a simple operation, the dimension on the normal side can be easily measured.

After the attracting tool 20 is set to the distortion-side reference point of the vehicle body, the spherical-shaped tip portion 12a of the spherical-tipped shaft 12 of the point-to-point distance gauge 10 is set on the magnet 22 of the attracting tool 20 while maintaining the shape of the point-to-point distance gauge 10. Then, the distortion of the vehicle body is measured based on the separate distance between the conical-shaped tip portion 13a of the conical-tipped shaft 13 and the distortion-side reference point. With such a simple operation, the distortion of the vehicle body can be easily measured.

In addition, as shown in FIG. 15, when the obstacle 500 such as a panel is present around the normal-side reference point 511, the spherical-shaped tip portion 12a of the spherical-tipped shaft 12 can be set while avoiding the obstacle 500 by adjusting the folding angle of the spherical-tipped shaft 12 and by setting the spherical-shaped tip portion 12a of the spherical-tipped shaft 12 on the magnet 22 of the attracting tool 20.

Further, even when the measurement point is positioned laterally to the reference point, for example, the distortion of the vehicle body can be measured as in the case of the above-described use method 2. That is, by rotating the conical-shaped tip portion 13a of the conical-tipped shaft 13 around the axial line of the main body 11 while maintaining the folding angle of the conical-tipped shaft 13, the distortion of the vehicle body can be measured based on the separate distance between the distortion-side measurement point and the conical-shaped tip portion 13a of the conical-tipped shaft 13.

(Measurement Method of Specific Distortion Amount of Vehicle Body)

Figure 16:
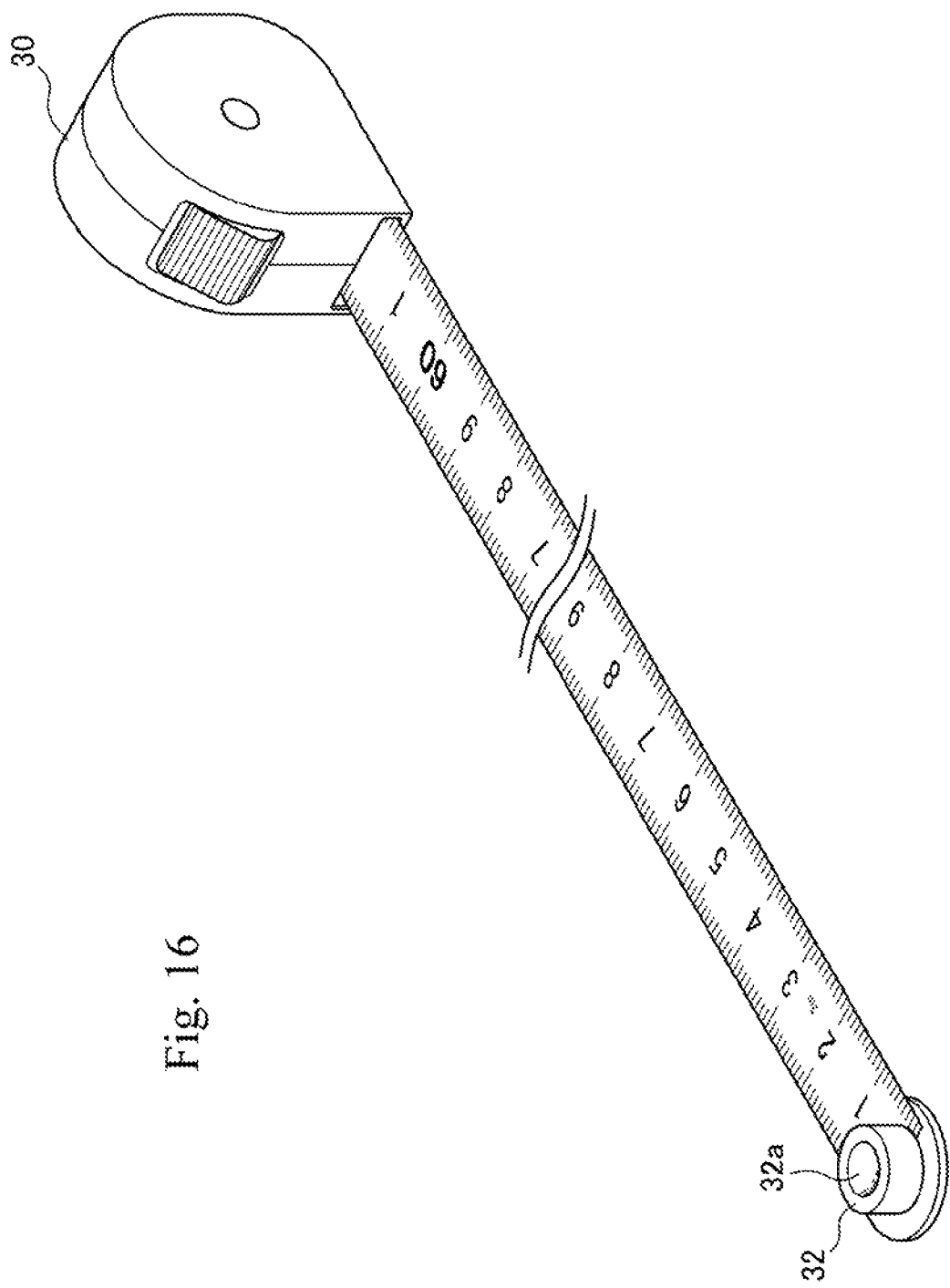
FIG. 16 is a drawing showing a measuring tape 30 for measuring the specific distortion amount of a vehicle body.

FIG. 16 is a drawing showing a measuring tape 30 for measuring the specific distortion amount of a vehicle body.

In some cases, specific dimensions (distortion amount) of the vehicle body is needed to compare with dimensions specified in a dimensional drawing of the vehicle body. In such cases, the measuring tape 30 shown in FIG. 16 may be used.

The measuring tape 30 comprises a magnet 32. The magnet 32 has an attracting area 32a which is recessed or perforated on the upper surface to attract the spherical-shaped tip portion 12a of the spherical-tipped shaft 12. The magnet 32 is attached to the attracting tool so that a center of the attracting area 32a is aligned to a zero point of the measuring tape 30.

When the specific dimensions (distortion amount) of the vehicle body is measured, the attracting tool 20 is set to the distortion-side reference point 521 of the vehicle body and the spherical-shaped tip portion 12a of the spherical-tipped shaft 12 of the point-to-point distance gauge 10 is set on the magnet 22 of the attracting tool 20. Subsequently, the conical-shaped tip portion 13a of the conical-tipped shaft 13 is set to the distortion-side measurement point 522. While maintaining the shape of the point-to-point distance gauge 10, the spherical-shaped tip portion 12a of the spherical-tipped shaft 12 is set on the magnet 32 of the measuring tape 30, and the conical-shaped tip portion 13a of the conical-tipped shaft 13 is aligned to the scale of the measuring tape 30. With such an operation, the specific distortion amount of the vehicle body can be measured. By comparing the specific values which are obtained through the above operation with the dimensional drawing of the vehicle body, the amount which should be corrected can be easily grasped.

(First Application of Point-to-Point Distance Gauge)

FIGS. 17A to 17C are drawings showing the first application of the point-to-point distance gauge 10. FIG. 17A is a general view and FIG. 17B and FIG. 17C are partially enlarged plan views.

The small diameter rod 113 of the point-to-point distance gauge 10 has a scale on the boundary with the end 113a. This scale numbers are sequentially assigned such as 1, 2, 3 to an arbitrary number, and the scale numbers are provided symmetrically with respect to zero. In addition, a match mark is provided on the end 113a.

With such a configuration, for example, when the normal-side measurement is performed in the use method 2 described above, the scale number where the match mark is located may be confirmed. And when the distortion-side measurement is performed, the match mark may be aligned to the same scale number on the opposite side. With such operations, more accurate measurement can be achieved because a symmetrical posture of the point-to-point distance gauge 10 can be easily formed with respect to the posture obtained in the normal-side measurement.

(Second Application of Point-to-Point Distance Gauge)

Figure 18:
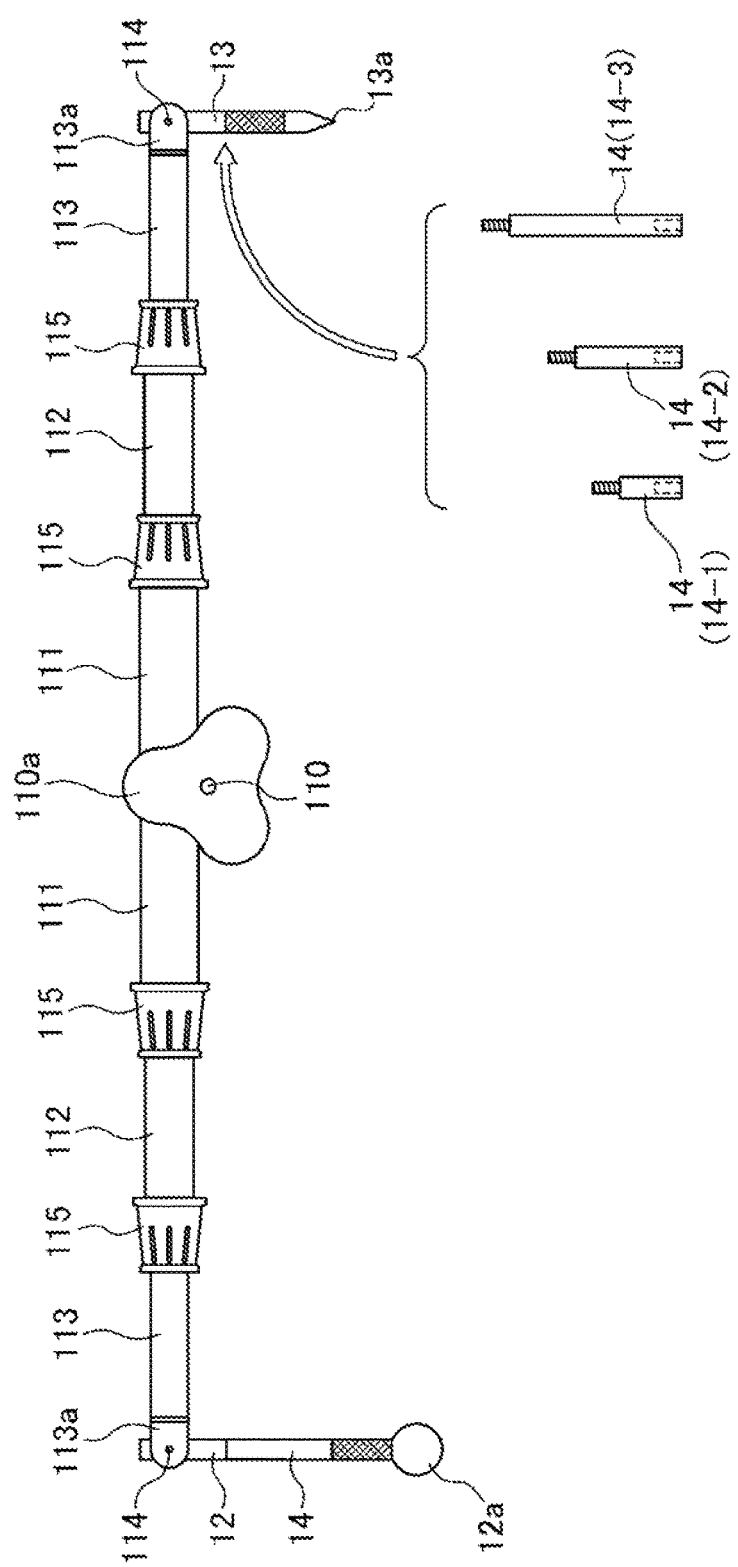
FIG. 18 is a drawing showing a second application of the point-to-point distance gauge 10.

FIG. 18 is a drawing showing the second application of the point-to-point distance gauge 10.

In the point-to-point distance gauge 10, the length of the shaft can be extended by adding a joint (intermediate member) 14 in the spherical-tipped shaft 12 or the conical-tipped shaft 13. A male screw is formed at one end of the joint 14, and a female screw is formed at the other end of the joint 14. By screwing these screws, the joint 14 can be interposed and fixed in the spherical-tipped shaft 12 and the conical-tipped shaft 13. As for the joint 14, a plurality of joints for different sizes, for example, a short length joint 14-1, a medium length joint 14-2, and a long length joint 14-3 may be prepared and appropriately used. Alternatively, an expandable (contractible) structure can be adopted by fitting one or more rods having different diameters as in the case of the body 11.

With such a configuration, an obstacle can be avoided by extending the spherical-tipped shaft 12 and conical-tipped shaft 13. Therefore, this configuration increases usefulness of the point-to-point distance gauge 10.

Although several embodiments of the present invention have been described above, the above-mentioned embodiments merely show a part of the application example of the present invention, and the technical scope of the present invention is not limited to the specific configuration of the above embodiments.

For example, the point-to-point distance gauge 10 and the attracting tool 20 in the drawings are shown deformed and the size is only an example.

Also, the material of each part of the point-to-point distance gauge 10 is not particularly limited. For example, when the large diameter rod 111, the medium diameter rod 112, and the small diameter rod 113 are made of metal, the durability can be improved. Alternatively, when the large diameter rod 111, the medium diameter rod 112, and the small diameter rod 113 are made of resin such as plastic, weight reduction can be achieved.

Further, the magnet 23 is used to fix the resin plate 21 of the attracting tool 20 in the use method 3. However, the resin plate 21 of the attracting tool 20 needs to be fixed to a windshield or the like in some cases. In such a case, the resin plate 21 may be fixed by using an adhesive tape such as a masking tape.

Furthermore, the small diameter rod 113 on the spherical-tipped shaft 12 side may be a fixed type in which the end 113a cannot be rotated.

In the above description, a vehicle body has been exemplified as the measuring object, but the measuring object is not limited to the vehicle body. The examples of other measuring objects may include a hull or even a building can be a measuring object. The measuring object is not particularly limited.

It is also possible to measure a plate thickness by placing the spherical-tipped shaft 12 on the surface of the plate and placing the conical-tipped shaft 13 on the back of the plate.

Furthermore, in the above description, the explanation has been made by using the example of the case of repairing the vehicle (a vehicle body), but of course, the present invention may be used for the manufacture of a vehicle or the like. The situation where the present invention may be used is not particularly limited.

The above embodiments can be appropriately combined.

The invention claimed is:

1. A point-to-point distance gauge, comprising:
   a rod-like main body formed by fitting a plurality of cylindrical rods having different diameters with one another so as to be expandable to a desired length;
   a spherical-tipped shaft provided on one end of the main body so as to be capable of being folded to a desired angle with respect to the main body and to be capable of maintaining the desired angle, a tip of the spherical-tipped shaft being formed in a spherical shape having a diameter larger than a shaft diameter; and
   a conical-tipped shaft provided on the other end of the main body so as to be capable of being folded to a desired angle with respect to the main body and to be capable of maintaining the desired angle, a tip of the conical-tipped shaft being formed in a conical shape.

2. The point-to-point distance gauge according to claim 1, wherein
   the one end of the main body is rotatable around an axial line of the main body, and
   the spherical-tipped shaft is rotatable around the axial line of the main body together with the one end of the main body.

3. The point-to-point distance gauge according to claim 1, wherein
   the other end of the main body is rotatable around the axial line of the main body, and
   the conical-tipped shaft is rotatable around the axial line of the main body together with the other end of the main body.

4. The point-to-point distance gauge according to claim 1, wherein
   the spherical-tipped shaft is pivotally supported by a pin provided on the one end of the main body.

5. The point-to-point distance gauge according to claim 1, wherein
   the conical-tipped shaft is pivotally supported by a pin provided on the other end of the main body.

6. The point-to-point distance gauge according to claim 1, wherein a hinge portion is provided in a middle of the main body, and the main body can be folded at the hinge portion.

7. The point-to-point distance gauge according to claim 1, wherein the spherical-shaped tip portion of the spherical-tipped shaft is made of a ferromagnetic material which is attracted to a magnet.

8. A point-to-point distance gauge system, comprising:

the point-to-point distance gauge according to claim 7; and an attracting tool configured to be set to a reference point for measuring a dimension of a measuring object, the attracting tool having the magnet, an upper surface of the magnet being recessed or perforated to form an attracting area for attracting the spherical-shaped tip portion of the spherical-tipped shaft.

9. The point-to-point distance gauge system according to claim 8, wherein the attracting tool further has an outer cylinder made of resin configured to hold the magnet on an inner peripheral surface of the outer cylinder, a length of the outer cylinder being longer than a thickness of the magnet.

10. The point-to-point distance gauge system according to claim 8, wherein the attracting tool further has an outer cylinder made of metal configured to hold the magnet on an inner peripheral surface of the outer cylinder, a length of the outer cylinder being longer than a thickness of the magnet.

11. The point-to-point distance gauge system according to claim 8, wherein the attracting tool further has a resin plate configured to hold the magnet and configured to be set to the measuring object.

12. The point-to-point distance gauge system according to claim 8, further comprising:

a measuring tape having a magnet, the upper surface of the magnet being recessed or perforated to form the attracting area for attracting the spherical-shaped tip portion of the spherical-tipped shaft, the magnet being attached on the measuring tape so that a center of the attracting area is aligned to a zero point of the measuring tape.

13. A method of measuring a distortion of the measuring object using the point-to-point distance gauge system according to claim 8, the method comprising:

a normal-side attracting tool setting step for setting the attracting tool on a normal-side reference point which is symmetrically located with respect to a distortion-side reference point of the measuring object;

an adjustment step for adjusting the point-to-point distance gauge in accordance with a distance between the normal-side reference point and a normal-side measurement point which is symmetrically located with respect to a distortion-side measurement point of the measuring object;

a normal-side gauge setting step for setting the spherical-shaped tip portion of the spherical-tipped shaft of the point-to-point distance gauge on the magnet of the attracting tool which is set in the normal-side attracting tool setting step;

an alignment step for adjusting a folding angle of the conical-tipped shaft to align the conical-shaped tip portion of the conical-tipped shaft with the normal-side measurement point;

a distortion-side attracting tool setting step for setting the attracting tool on the distortion-side reference point;

a distortion-side gauge setting step for setting the spherical-shaped tip portion of the spherical-tipped shaft on the magnet of the attracting tool which is set in the distortion-side attracting tool setting step while maintaining a shape of the point-to-point distance gauge which is adjusted in the alignment step; and a distortion measurement step for measuring the distortion of the measuring object based on a separate distance between the conical-shaped tip portion of the conical-tipped shaft and the distortion-side measurement point.

14. The method of measuring the distortion according to claim 13, wherein in the normal-side gauge setting step, the spherical-shaped tip portion of the spherical-tipped shaft is set on the magnet of the attracting tool which is set in the normal-side attracting tool setting step while adjusting the folding angle of the spherical-tipped shaft.

15. The method of measuring the distortion according to claim 13, wherein in the distortion measurement step, the distortion of the measuring object is measured based on the separate distance between the conical-shaped tip portion of the conical-tipped shaft and the distortion-side measurement point by rotating the conical-shaped tip portion of the conical-tipped shaft around the axial line of the main body while maintaining the folding angle of the conical-tipped shaft.

* * * * *